United States Patent [19]
Hodorowski

[11] Patent Number: 5,530,643
[45] Date of Patent: Jun. 25, 1996

[54] METHOD OF PROGRAMMING INDUSTRIAL CONTROLLERS WITH HIGHLY DISTRIBUTED PROCESSING

[75] Inventor: John Hodorowski, Hales Corners, Wis.

[73] Assignee: Allen-Bradley Company, Inc., Milwaukee, Wis.

[21] Appl. No.: 360,862

[22] Filed: Dec. 21, 1994

Related U.S. Application Data

[63] Continuation-in-part of Ser. No. 111,237, Aug. 24, 1993, Pat. No. 5,452,201.

[51] Int. Cl.$^6$ ..................................................... G06F 19/00
[52] U.S. Cl. ........................ 364/191; 364/131; 364/188; 364/578; 395/159
[58] Field of Search ..................... 364/131–136, 364/146, 147, 185, 188–192, 488, 491, 578; 395/155, 159, 161, 500, 700

[56] References Cited

U.S. PATENT DOCUMENTS

| | | | |
|---|---|---|---|
| 4,831,525 | 5/1989 | Saito et al. | 395/700 |
| 5,051,938 | 9/1991 | Hyduke | 364/578 |
| 5,103,421 | 4/1992 | Ward et al. | 395/700 |
| 5,142,469 | 8/1992 | Weisenborn | 364/146 |

*Primary Examiner*—Roy N. Envall, Jr.
*Assistant Examiner*—Steven R. Garland
*Attorney, Agent, or Firm*—Keith M. Baxter; John M. Miller; John J. Horn

[57] ABSTRACT

A highly distributed industrial control system employs a number of separate control modules communicating together on a shared communications medium. Each module emulates one or more basic electrical parts having electrical terminals, such as switches and relays, and transmits production messages indicating the state of the parts, such as conducting current or not. A connection list for each part in each control module defines message identifiers of other parts whose production messages are received by the control module and interpreted as current flow to one or more of its parts. The control system is programmed by generating a schematic on a programming terminal showing connections of terminals on symbols of the parts such as would represent actual wiring of the emulated parts. A parts layout diagram is used in conjunction with the schematic to identify each part to a physical module. In this way the program is divided to run concurrently on the various modules without explicit instructions by the programmer.

15 Claims, 17 Drawing Sheets

| GROUND | CHASSIS OR FRAME NOT NECESSARILY GROUNDED | PLUG AND RECP. | TIME DELAY AFTER COIL | | | | RELAY, ETC. | | THERMAL OVER-LOAD |
|---|---|---|---|---|---|---|---|---|---|
| | | | ENERGIZED | | DE-ENERGIZED | | NORMALLY OPEN | NORMALLY CLOSED | |
| | | | NORMALLY OPEN | NORMALLY CLOSED | NORMALLY OPEN | NORMALLY CLOSED | | | |

COILS

| RELAYS, TIMERS, ETC. | SOLENOIDS, BRAKES, ETC. | | | | THERMAL OVERLOAD ELEMENT | CONTROL CIRCUIT TRANSFORMER |
|---|---|---|---|---|---|---|
| | GENERAL | 2-POSITION HYDRAULIC 2-H | 3-POSITION PNEUMATIC 3-P | 2-POSITION LUBRICATION 2-L | | H1 H2 H3 H4 / X1 X2 |

COILS (CONTINUED)

| AUTO TRANSFORMER | LINEAR VARIABLE DIFFERENTIAL TRANSFORMER | VARIABLE AUTO-TRANSFORMER |
|---|---|---|

FIG. 5(d)

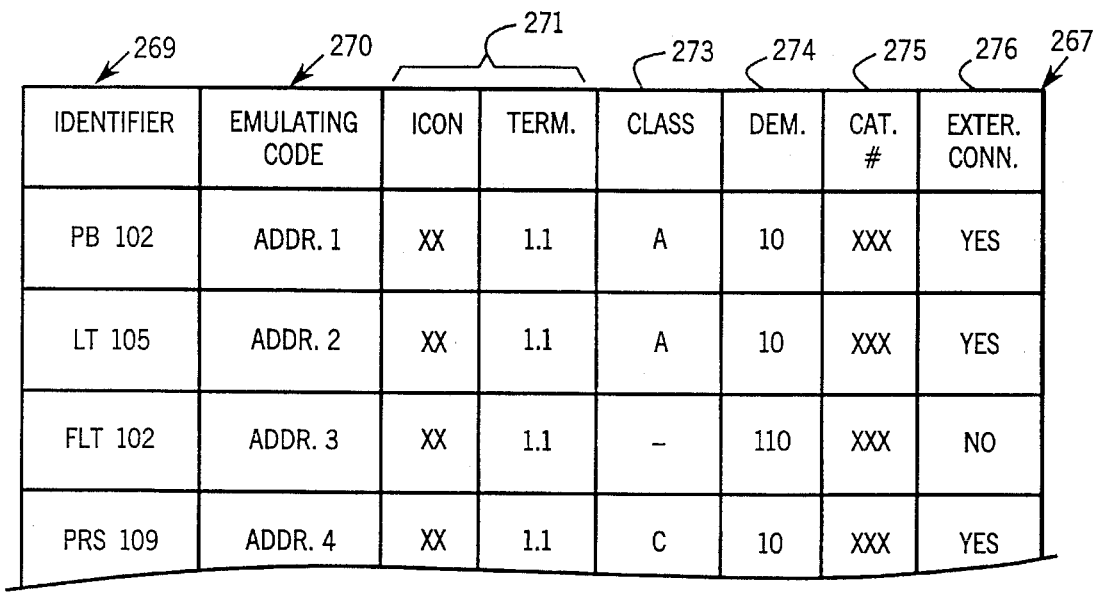
FIG. 16
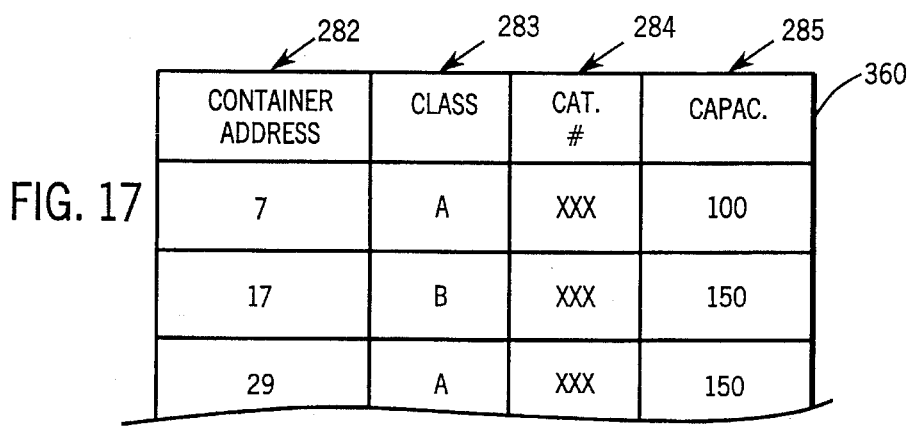
FIG. 17
FIG. 12
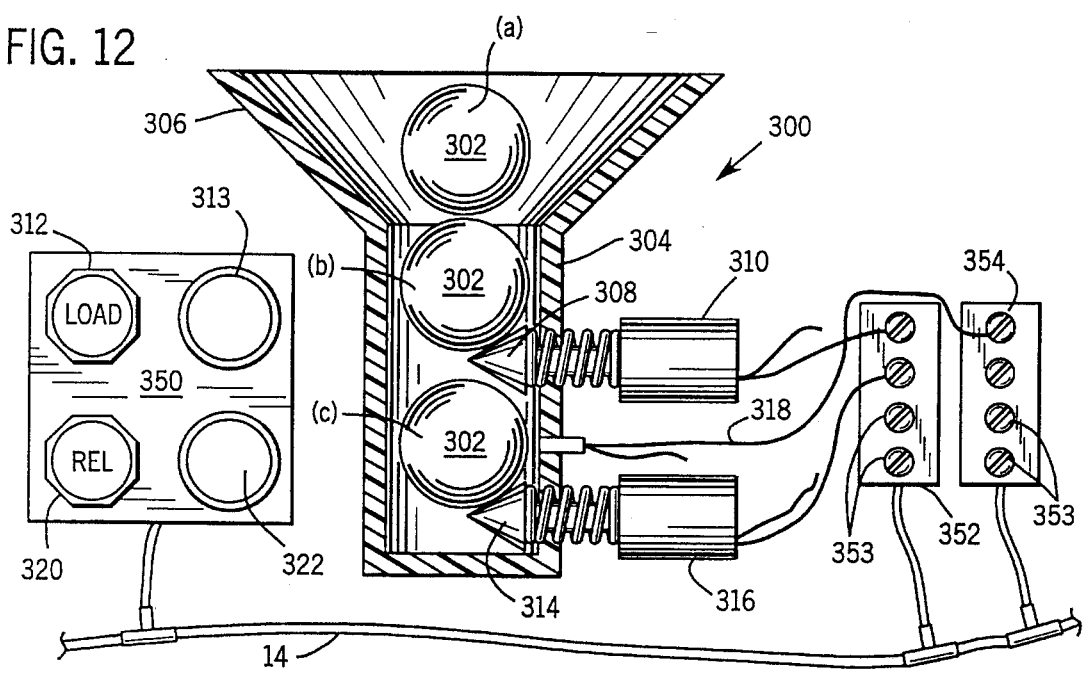

5,530,643

METHOD OF PROGRAMMING INDUSTRIAL CONTROLLERS WITH HIGHLY DISTRIBUTED PROCESSING

This application is a continuation-in-part of application 08/111,237 filed Aug. 24, 1993, now U.S. Pat. No. 5,452,201.

BACKGROUND OF THE INVENTION

1. Field of the Invention

This invention relates to industrial control systems, including programmable controllers, and more particularly, to a highly distributed industrial control system and a method for programming the same.

2. Background Art

Industrial controllers such as those described in U.S. Pat. Nos. 3,810,118; 3,942,158; 4,165,534; and 4,442,504 are typically centralized, high-speed computers that may be connected to industrial equipment, such as automated assembly lines or machine tools, to operate such equipment in accordance with a stored program. The stored program includes instructions, which when executed, examine the condition of selected inputs to the controller from sensing devices on the controlled equipment, and energize or de-energize selected outputs or actuators from the controller to operate devices on the controlled equipment.

Inputs to the industrial controller may be discrete binary signals, such as those from switches, which may detect limits of process variables such as motion, temperature, time, or other quantities, or the inputs may be analog measures of process variables which are generally then converted to digital words for processing, or the inputs may be multi-variable information.

Similarly, the outputs of the industrial controller may be either discrete binary signals as produced, typically, by mechanical or solid state relays; analog outputs produced by means of a digital to analog converter; or multi-variable commands. Some of the inputs and outputs to the centralized controller may be remotely located and connected to the controller by means of a digital communications link. Typically, the network connects the controller with a remote I/O rack at which a number of inputs and outputs are clustered.

The centralized architecture of current industrial control systems reflects both the historically high cost of computer hardware (as may be reduced by the use of a single centralized controller) and the desire for centralized reporting and coordination of the operation of an entire industrial process. Nevertheless, a centralized controller architecture is not ideal for all control tasks.

For some simple control tasks, with few inputs and outputs, the centralized controller may be unnecessarily complex and expensive, providing unneeded features and capacity. Conversely, for some complex control tasks, with many inputs and outputs, the speed limitations of the centralized controller, or its link to remote inputs and outputs, may significantly degrade the performance of the control system. The centralized controller processes each input and output of the control system, sequentially. For large programs, a significant delay may occur between the changing of an input and the control of a corresponding output. If the delay is large enough, the control system may become sluggish or unpredictable. With a centralized controller, the state of each input and output must be repeatedly transmitted to the centralized controller at a rate sufficient for the target application. When there are many remote inputs and outputs to the control system, the capacity of the link between the I/O and the centralized controller may become a significant limitation.

In a centralized architecture, a failure of the single controller typically disables the entire control system. Troubleshooting the cause of the controller failure is hampered if the failure is such that the failed controller cannot report information about its internal operation or execute troubleshooting programs.

Present industrial controllers are ordinarily programmed by means of a "ladder logic" language in which the control program is represented as ladders whose vertical rails represent a power source or power return and whose rungs are series and parallel connected contacts and relay coils. The contacts may be either normally-open or normally-closed as controlled either by external inputs or by relay coils. The limited set of commands in a ladder diagram (contacts and coils) may be efficiently processed by a reduced instruction set computer ("RISC").

Although this language is simple in concept, for extremely long programs, a ladder diagram may be difficult for a human programmer to interpret. Troubleshooting large programs written in ladder logic can be difficult because the flow of control in the ladder program is not readily visualized. Further, for most control systems, additional functional elements will be required beyond contacts and relay coils, such as counters, comparators, timers and the like, whose implementation as relay logic is extremely cumbersome.

SUMMARY OF THE INVENTION

The present invention is an architecture and programming method for a highly distributed industrial control system where each of the control modules, for example, each input, sensor, output, or actuator carries with it a small portion of the total control program. The distributed nature of this architecture allows for extremely fast processing times because the actual program may be simultaneously executed on the various control modules. The distributed nature of the architecture also improves the chance that a failure of a single component will not disable the entire control system, and improves the ability to troubleshoot any failure by interrogating the remaining, undamaged control modules.

Importantly, the present invention provides a highly distributed control architecture where each control module emulates a standard elemental electrical component, such as a switch or light. This approach provides not only an architecture, but a programming "language" in the form of an electrical schematic, that is particularly well suited to simple industrial controls.

For reasons of efficiency, more than one elemental function may be performed by a given electronic module. For example, multiple pushbutton switches, each being an elemental function, may be incorporated into a single enclosure having a single microprocessor communicating with the common link. In addition, some elemental functions, for example, a timer, may have no connection with the outside world and hence may be efficiently emulated by an electronic module having another primary task, such as that of controlling a light.

A panel layout drawing provides a simple method of allocating pieces of the overall control program among the various control modules—a problem that often plagues attempts at "parallel processing". The panel layout drawing flexibly and intuitively defines what physical hardware emulates what elemental functions.

More particularly, then, the present invention provides a graphical language for programming a highly distributed industrial controller comprised of a large number of physically distinct modules, each emulating elemental electrical functions, where the modules communicate along a shared communications medium by transmitting messages on that medium, and where one module may emulate several elemental functions.

The programming involves first generating a logical diagram depicting the industrial controller in the form of an electrical schematic of electrical symbols on an electronic display screen. The symbols each represent an elemental electronic function and have at least one input terminal and one output terminal between which current flows according to the elemental function. The terminals of one symbol are connected on a schematic to the terminals of other symbols and at least one electrical symbol is connected to a power source symbol.

In the second step of the programming, a physical diagram is generated showing outlines representing actual modules linked to symbols representing the elemental functions to be performed by the modules. The modules are programmed to emulate the elemental functions linked to them by the physical diagram and the elemental functions are virtually connected by according to the logical diagram of the schematic.

This latter step is accomplished by compiling the physical and logical diagrams to generate a communication table. The communication table in turn establishes the protocol of communications between the modules on the communication medium so that the elemental functions executed by each module may communicate with selected other elemental functions as if those elemental functions were wired together according to the schematic.

Thus, it is one object of the invention to provide a method of programming highly distributed industrial controllers that offers an intuitive way not only to describe the logic of the control but to allocate the processing functions to various spatially distributed modules.

Industrial process designers currently produce both logical schematics and physical "panel layout" views. These drawings are used to describe the construction and operation of discrete industrial control systems to electricians and others who must assemble and wire together the various components. The schematics and panel layout drawings are typically prepared on computer assisted design ("CAD") systems. The present invention uses data files developed by the CAD system as an input to a compiler which allocates the functions among the modules and virtually wires them together through messages on the link.

Thus, it is another object of the invention to provide a programming language which minimizes effort by the industrial control designer. Using CAD produced panel layout drawings to allocate processing functions among distributed components adds no additional steps to the design process.

Each module may have a predetermined capability index assigned to it indicating those elemental functions that can be performed by that module or how many of a particular kind of elemental functions can be performed by that module. Assignments of the elemental functions of the logical diagram to a particular module may be checked against the capability index to provide a warning to the programmer or alternatively to re-allocate the elemental function to another module. The allocation of elemental functions to modules can be constrained so that elemental functions that need to be associated with a particular module, for example because of connections to the outside world, will not be moved.

Thus, it is another object of the invention to permit automatic allocation of elemental functions to spatially separate modules according to the physical diagram produced by the designer but in a manner consistent with the physical limitations of the electronic modules. Use of a capability index permits proper allocation to be verified without operator intervention and without affecting the schematic diagram.

The foregoing and other objects and advantages of the invention will appear from the following description. In the description, reference is made to the accompanying drawings which form a part hereof and in which there is shown by way of illustration, a preferred embodiment of the invention. For clarity, two simple examples of a control system are provided. Such embodiments do not necessarily represent the full scope of the invention as claimed.

BRIEF DESCRIPTION OF THE DRAWINGS

FIGS. 5(a)–(d) are an example set of electrical graphic symbols having terminals, such as may define the elemental functions of the parts of the control modules of the present invention and which, together with wire lines, form the programming language of the highly distributed control system of the present invention;

FIG. 12 is a perspective view of a simple process for staging and releasing balls such as may use the highly distributed control system of the present invention;

FIG. 16 is a chart depicting an elemental function data base of supplemental information about the elemental functions that may be interconnected in the logical diagram of FIG. 13;

FIG. 17 is a chart representation of an electronic module data base of information about the physical modules that may be interconnected in the logical diagram of FIG. 13.

DETAILED DESCRIPTION OF THE PREFERRED EMBODIMENT

Figures 1, 2:
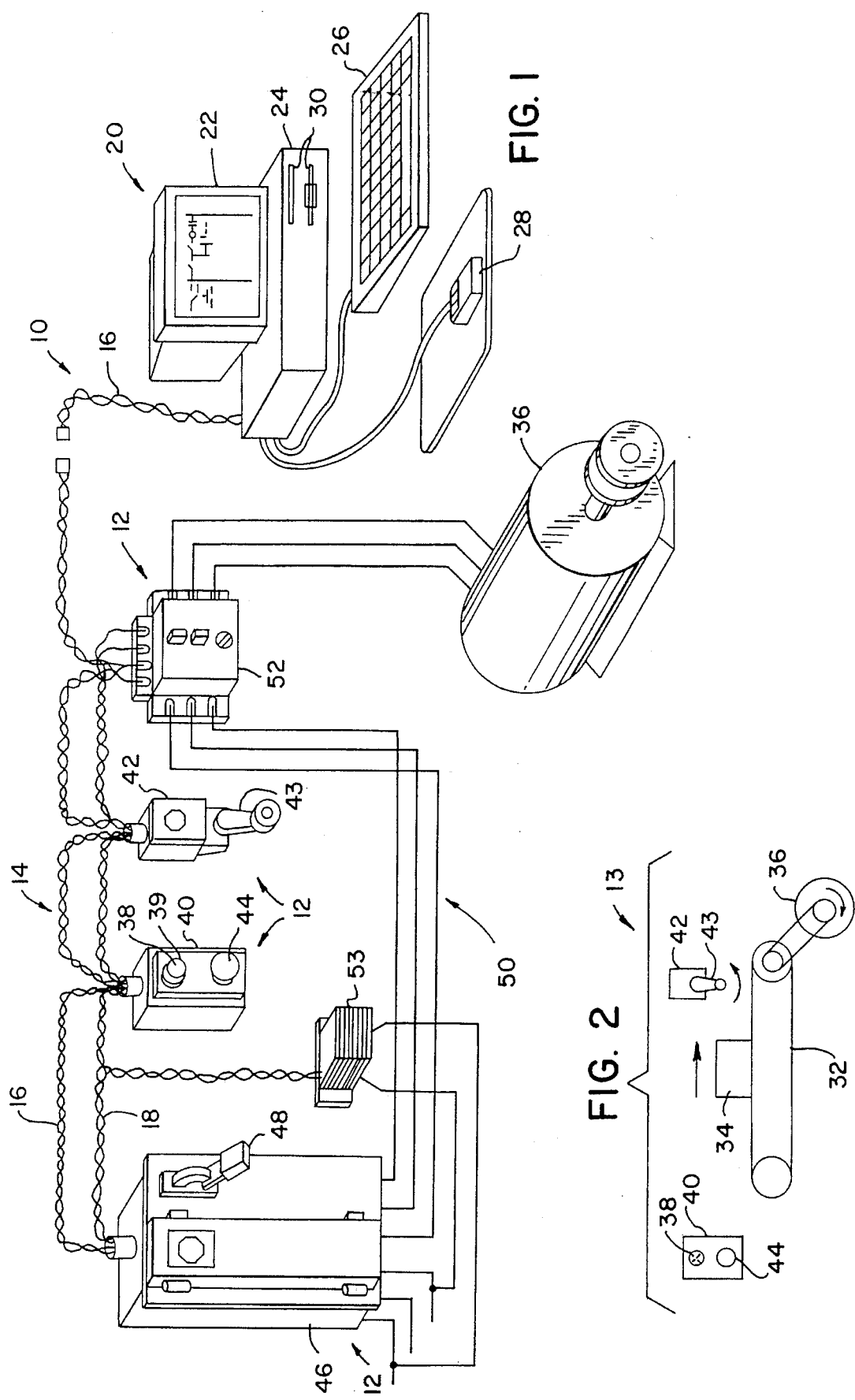
FIG. 1 is a pictorial representation of a simple, highly distributed control system according to the present invention having a number of interconnected control modules for being programmed by a programming terminal to control a motor for a conveyor system.
FIG. 2 is a simplified representation of a conveyor system controlled by the control system of FIG. 1.

Referring to FIG. 1, a highly distributed industrial control system ("HDIC") 10 includes a number of control modules 12 connected on a shared communications medium 14. The communications medium 14 employs a cable 16 of copper conductors along which digital messages may be transmitted, and optionally two power conductors 18 which provide 24 volts DC to the control modules 12. As will be described in more detail below, each control module 12 is connected in parallel across the twisted pair 16 so that communication may occur between any module and all of the other control modules 12.

Also connected to the twisted pair 16 of the communications medium 14 is a programming terminal 20 having a display screen 22, a processor 24 and a keyboard 26. The programming terminal may be a general purpose personal computer, such as are well known in the art, with the display screen 22 providing for the output of text and graphics from the processor 24, and the keyboard 26 allowing for the entry of alphanumeric characters to the processor 24. The programming terminal 20 also includes disk drive 30 which allows programs to be loaded to the programming terminal 20 from removable magnetic recording disks (not shown) inserted in the disk drive 30, and which allow data to be saved to the magnetic recording disks. A cursor control device such as a mouse 28 may be connected to the programming terminal 20 to aid in the manipulation of graphic icons as will be described below.

The programming terminal 20 includes an interface to the twisted pair 16 such as will be described in detail with regard to the control modules 12 below and which allows communication to the control modules 12 in a manner similar to that provided among the control modules 12.

HDIC Applied to a Conveyor Line

Referring now to FIGS. 1 and 2, an example of a highly distributed industrial control ("HDIC") system 10 incorporates five control modules 12 to control a simple conveyor line 13. The conveyor line 13 includes a conveyor belt 32 that may move products 34 along its upper surface in response to the rotation of the conveyor belt by motor 36. Motion of the conveyor belt is initiated by pressing a lighted pushbutton 38 on a pushbutton module 40. Motion of the conveyor belt 32 is stopped when the product 34 strikes the actuator arm 43 of a limit switch module 42 or when the stop pushbutton 44 is pressed. The stop pushbutton is also incorporated within the pushbutton module 40.

Figure 3:
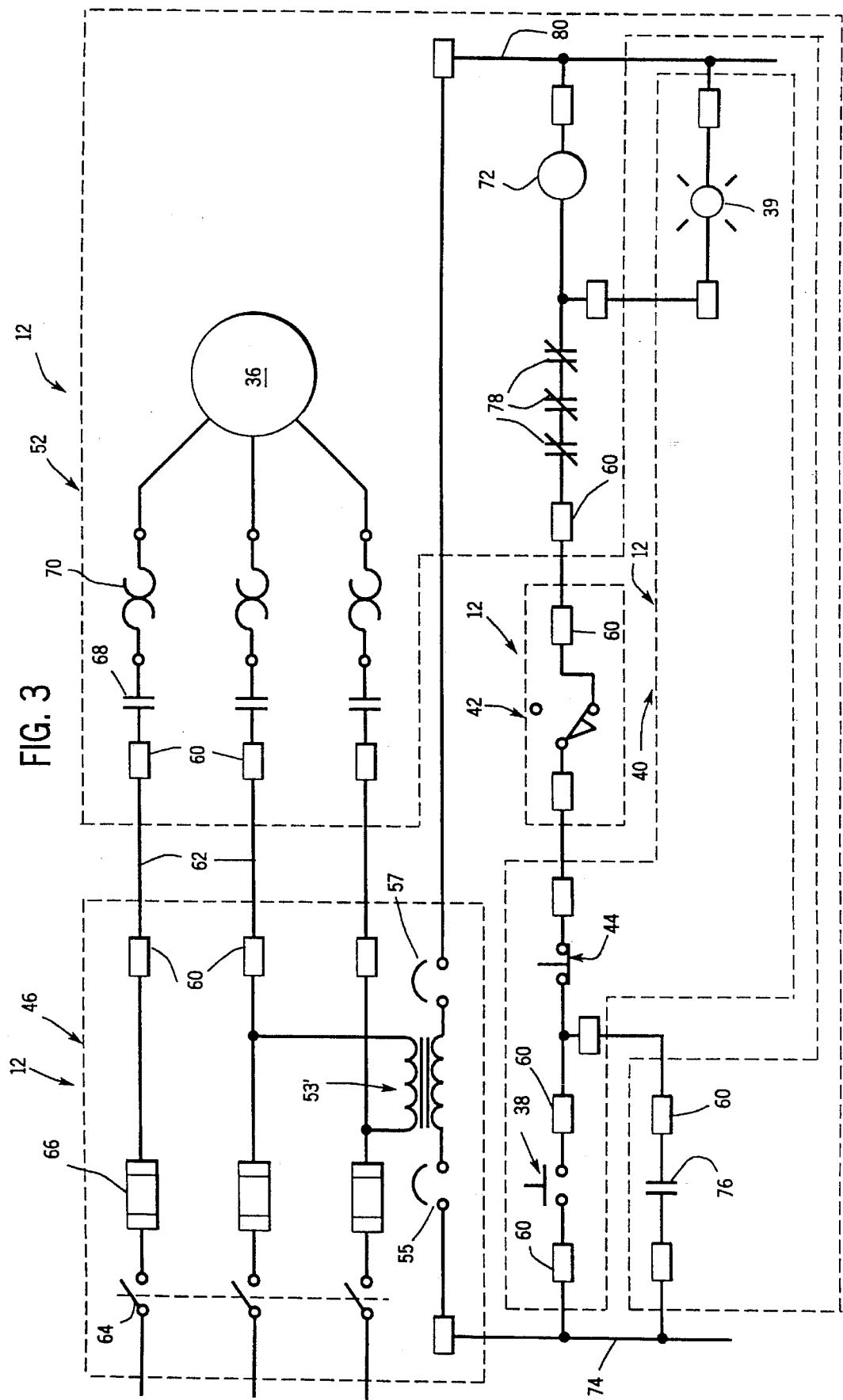
FIG. 3 is a schematic representation of the control system of FIG. 1 as implemented with standard electrical components showing the division of the functionality of those components into the control modules of FIG. 1.

Referring also to FIG. 3, the first control module 12 employed in this HDIC system 10 is a disconnect module 46 which includes fusing for the three-phase power to the motor 36 and a disconnect switch 64 actuated by handle 48. The disconnect module 46 receives the communications medium 14 and also three-phase power which it connects or disconnects from a disconnectable three-phase bus 50. Generally, the status of the output of the disconnect as either connecting to or disconnecting the three-phase power from the bus 50 is communicated on the communications medium 14 whereas the actual actuation of the disconnect is performed manually By means of the handle 48.

A physical transformer 53, providing the 24 volts of the power conductors 18 is typically connected upstream of the disconnect module 46 to preserve network communications even when the disconnect module 46 disconnects three-phase power from the control system. In this example, the transformer 53 is not a control module 12. Nevertheless, a virtual transformer 53' is contained within the disconnect module having a primary winding connected across two of the phases of the three-phase power switched by the disconnect switch. The leads of the secondary winding of this virtual transformer pass through virtual circuit breakers 55 to power source rail 74 and circuit breaker 57 to power return rail 80 for the control logic. The virtual transformer provides a number of system features, including: (1) opening the disconnect 64 disables all associated control logic, (2) the virtual circuit breakers 55 and 57 provide an intuitive method of disabling selected logic for editing purposes.

As will be described, generally, the parts of the modules 12 are virtually connected via the communications medium 14 identically to the connections of their physical counterparts. One exception is the physical transformer 53. Unlike the virtual transformer 53', the physical transformer 53 is connected before the disconnect module 46 so that the control modules 12 do not lose actual power when three phase power is disconnected by the disconnect module 46.

The second control module 12 is the pushbutton module 40 which as briefly described includes three parts: a start pushbutton 38, lamp 39 for lighting pushbutton 38, and an unlighted stop pushbutton 44. The pushbutton module 40 provides a control module 12 that allows user input to the HDIC system 10.

The third control module 12 is a limit switch module 42 which is an example of the simplest possible control module 12 having only a single part (a switch) providing only a single switching function in response to movement of its actuator arm 43.

The fourth control module 12 is an motor starter module 52 which receives the three-phase power from the bus 50, after the disconnect module 46, and transmits it to the motor 36. The motor starter module 52 includes four different parts: 1) "thermal" overload elements 70 for each phase, which detect current flow through the windings of the motor 36 to actuate 2) normally-closed overload contacts 78, and 3) a relay coil 72 for controlling 4) normally-open contacts 68 on each phase of the three-phase power to connect and disconnect the motor 36 absent an overload condition and 5) latching auxiliary contact 76. The overload trip point for the overload elements 70 is set by the programming terminal 20 over the communications medium 14 as will be described. It should be noted that although for this example the series connected contacts 78 are treated as one part, each of the contacts 78 could be independently connectable to other parts and thus treated as a separate part. For the purpose of clarity, the following discussion will deal principally with the external wiring between the modules rather than the internal wiring within the modules

Modules, Parts and Virtual Connections

Generally each control module 12 may have any of a variety of different functions and preferably emulate basic electronic components such as are used in industrial control. The elemental electrical components, which alone or in combination define the function of the control modules 12, are termed "parts" and are generally characterized by their having two or more terminals between which current may flow depending on the state of the part. Thus, as mentioned above, disconnect module 46 contains a number of parts (fuses and contacts). In contrast, limit switch module 42 contains a single part being a single pole double throw switch. Representative symbols for some parts are collected in FIG. 5 which shows standard JIC graphic symbols from a JIC manual.

More generally, the terminals of the parts may represent paths of information flow such as might be obtained in a comparator, a one shot, an adder or a counter employed in digital electronics. Ideally, each part embodies an elemental function needed in the HDIC system. This permits maximum flexibility connecting the components of the HDIC system 10 and, as will be discussed below, provides an intuitive method of allocating the entire control program among the control modules 12, and offers maximum resolution for the purposes of troubleshooting the HDIC system 10.

Referring again to FIG. 1, generally each of the control modules 12 are interconnected by the communications medium 14. This form of connection will be termed "network" connection. However, in the implementation of the control program, certain parts of each control module 12 only respond to selected other parts of that or other control modules 12 on the communications medium 14. Hence, the parts of the control modules may be considered to be "virtually" connected only to some of the other parts. The paths of virtual connections are determined by the process of comparing message identifiers of messages on the communications medium 14 to a connection list of message identifiers and will be described in detail below.

In contrast to the network connection of the communications medium 14, and the virtual connections between parts, certain control modules 12 also have "physical" connections to power and the controlled process. For example, the disconnect module is physically connected to the three-phase power and the power bus 50 for actually providing voltage to the motor via motor starter module 52. This physical connection, in which current actually flows, is distinct from the virtual connection.

Referring to FIG. 3, the desired paths of virtual connections between parts may be represented in a schematic showing each part as a standard electrical symbol. The virtual connections between parts are shown by solid lines 62, connecting the terminals on the symbols associated with each part, which represent virtual connections between clusters of parts within the modules 12. The module terminals 60, shown as rectangles, are dependant on the arbitrary aggregation of parts within modules 12 and appear on the schematic to be generated on the programming terminal 20, in a specific mode, only when actual module hardware is selected, and the aggregation is known, as will be described below.

Thus, for example, disconnect module 46 contains seven parts: three contacts 64 of a parallel-actuated disconnect switch, controlled by handle 48, three fuse 66 in series with the contacts 64, and virtual transformer 53'. The parts are internally connected within the module 46 so that there are only four module terminals 60 for virtual connections with other modules: one for the downstream side of each series connected contacts 64 and fuse 66 and one for the lead of the virtual transformer providing power to the power source rail 74. Module terminals 60 are not shown for the upstream side of each series connected contacts 64 and fuse 66 because no module 12 will be connected upstream of the disconnect module 46. Further, module terminals 60 are not provided between the fuses 66 and the contacts 64 because no module 12 will be connected there.

Each module terminal 60 is either an upstream terminal that may receive current flowing directly or through other modules 12 from the power source rail 74 or a downstream terminal providing current directly or through other modules 12 to the power return rail 80. With one exception, the leftmost terminal is the upstream terminal 60 and the rightmost terminal is the downstream terminal 60, observing the convention of left to right power flow. The exception is the virtual transformer 53 where the downstream terminal 60 is to the left to conserve schematic space.

The grouping of the parts in FIG. 3 within dotted lines indicates the physical grouping within control modules 12 of FIG. 1. This physical grouping is permissibly ignored for the purpose of constructing the schematic where, ideally, the virtual connections of the parts dictates their respective placement on the schematic. The graphic symbol for any part of a modules 12 may be located anywhere on the schematic diagram.

In the actual electrical devices emulated by the parts of the control modules 12, the current may flow without restriction in either direction between terminals, as is the case in a switch. As mentioned above, however, the virtual connections between the parts of the control modules 12, by default, observe the more limiting convention that current flows only in one direction between terminals of the parts. Hence, there is a definite upstream or input terminal and a downstream or output terminal as defined by the direction of current flow. This convention is reflected in the symbols that will be used to represent the parts where current may flow only from the left most terminal of the symbol to the right most terminal. As will be understood from the following description, however, the convention of bi-directional current flow may be easily implemented through the present invention's system of virtual connections.

Referring to FIGS. 1 and 3, the parts of the control modules 12 are virtually and physically connected as follows: The disconnect module 46 receives three-phases of power through a physical connection to three-phase power—the virtual connection is implicit. On the downstream side, the disconnect module 46 is physically connected to the three-phase bus 50 to provide power to the motor starter 52 and ultimately to the motor 36. Correspondingly, downstream terminals 60 of disconnect module 46 are virtually connected by lines 62 to upstream terminal 60 of motor starter module 52, mirroring this physical connection. There is an internal virtual connection between the switched three phase power and the primary winding of the virtual transformer 53'. A downstream terminal 60 of the secondary winding of the virtual transformer 53' is connected to other upstream terminals via the power source rail 74.

The upstream terminal 60 of pushbutton 38 in module 40 is also virtually connected to the virtual transformer 53' via the power source rail 74, however there is no physical connection. The downstream terminal 60 of the pushbutton 38 is in turn virtually connected to the input terminal of pushbutton 44. This input terminal of pushbutton 44 is also virtually connected to an output terminal 60 of a latching auxiliary contact 76 which is also virtually connected to power source rail 74 so as to shunt the terminals of pushbutton 38 to provide a latching action as is generally understood in the art. Latching auxiliary contact 76 is a normally-open auxiliary contact also controlled by coil 72. Again, none of these virtual connections have corresponding physical connections.

The output of pushbutton 44 is virtually connected to an upstream terminal 60 of the pole of limit switch module 42 whose normally-closed contact is virtually connected through an output terminal 60 to the input terminal 60 of module 52 to be received by a series connected set of three normally-closed contacts controlled by the thermal overload element 70 to open if there is a thermal overload. These normally-closed contacts 78 provide a virtual path to one terminal of coil 72, through coil 72 and another terminal 60 to a power return rail 80. A lamp 39, used to light pushbutton 38, is virtually connected between the power return rail 80 and the input terminal of the coil 72 to provide an indication that coil 72 has been energized.

The description above is essentially identical to the physical wire connections of actual parts such as coils, pushbuttons and limit switches such as would be used to implement the conveyor system described above. Nevertheless, the connections are not actual wires but simply paths of communication affected by messages on communications medium 14 as will be described in detail below.

Module Hardware

Figure 4:
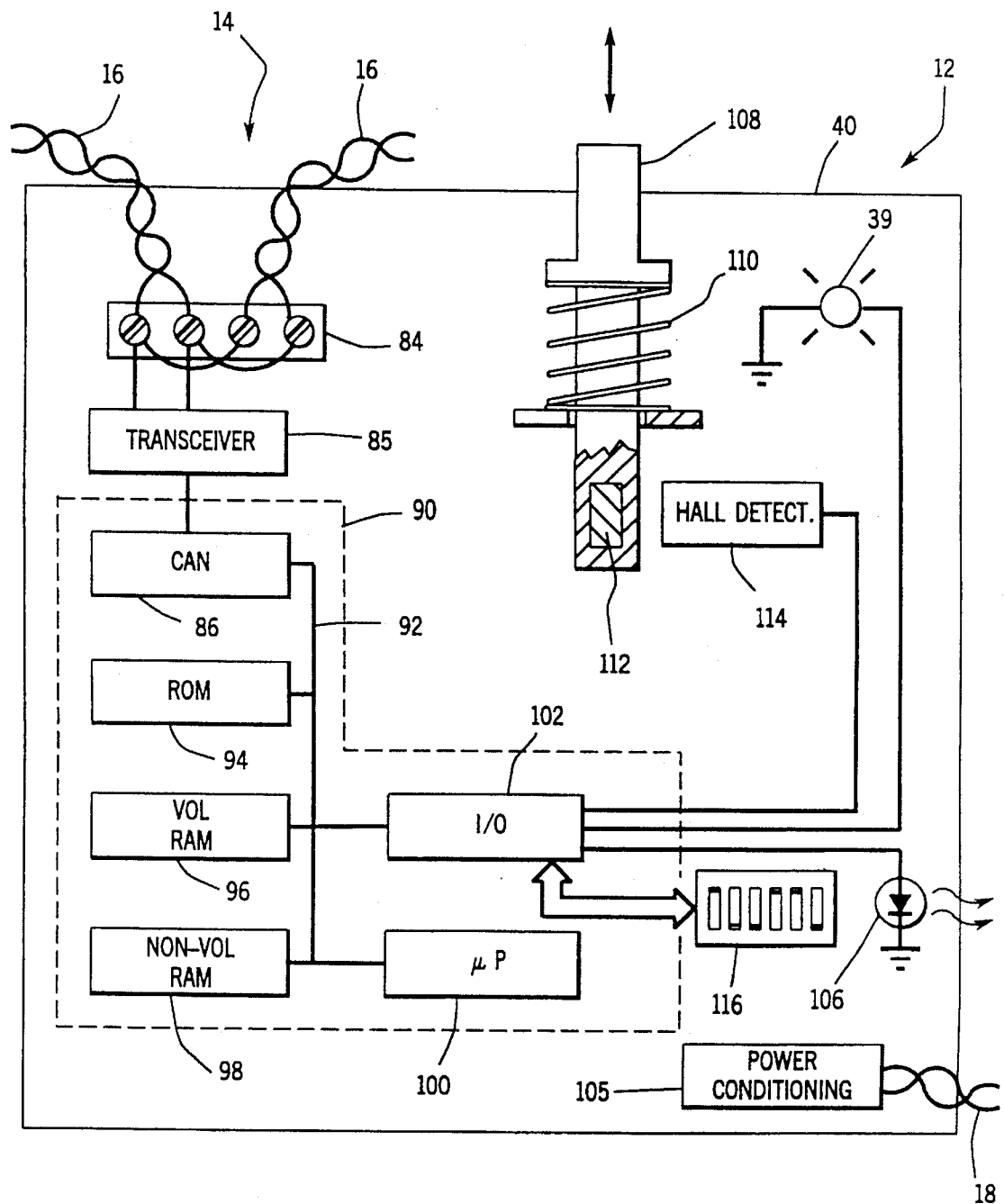
FIG. 4 is a schematic diagram of a control module suitable for use with the present invention.

Referring now to FIG. 4, each control module 12 shares a number of characteristics. Each control module 12 may receive the power conductors 18 via power conditioning circuitry 105 which provides protections against reverse polarity and high voltage spikes on the power conductors 18 such as is well known in the industrial electronics field.

Also as described above, the control modules 12 each receive the twisted pair 16 of conductors of communications medium 14. Specifically, the twisted pair 16 is received by two terminals of a removable terminal strip 84 and connected by jumpers in a "daisy chain" fashion. The signal on twisted pair 16 is tapped off of the terminal strip 84 at the first two terminals to be received by a transceiver 85 and then by CAN link controller 86 that provides the necessary timing and bit sequences for the transmission and receipt of messages along the communications medium 14.

The CAN link controller 86 provides a memory mapped interface for the receipt and transmission of formatted messages along the communications medium 14. One example of a CAN link controller 86 is a 80C592 microcontroller preprogrammed for executing the CAN protocols such as is commercially available from Signetics Corporation having offices in Sunnyvale, Calif. The CAN specification defines the requirements which comprise the Media Access Control (MAC) and physical signaling layers of the ISO/OSI for Data Communication Networks. The CAN protocols are specified in ISO document ISO/TC22/SC3/WG1 as authored by Robert Bosch GmbH, hereby incorporated by reference. Generally the CAN standard allows for the communication of asynchronous digital messages along a twisted pair of conductors such as may comprise communications medium 14 at speeds of up to 1 Mbit/sec. The CAN protocol specifies a zero to eight byte data message including an eleven bit arbitration field which determines priority when two nodes need to transmit messages at the same time.

The CAN link controller 86 includes an internal buffer memory (not shown) that may be directly addressed. Each location of the buffer may be loaded with an arbitration field for use in sending and receiving messages. In the case of messages to be sent, the message buffer is also loaded with message data. The CAN link controller 86 automatically transmits the message when the communications medium 14 is free according to the priority of its arbitration field and then provides a signal that the message has been transmitted.

For messages being received, when a message arrives, it is compared against the arbitration fields of each buffer location and the first location with the same arbitration field receives the message. At the time of receipt a signal is generated indicating the receipt.

The CAN link controller 86 communicates by bus 92 with a read only memory 94, a volatile RAM 96, a nonvolatile RAM 98, microprocessor 100 and digital I/O circuitry 102 as are generally understood in the art and as may be implemented within a single dedicated microprocessor 90.

The digital I/O circuitry 102 will communicate with different module specific inputs and outputs depending on the characteristics of control module 12. For example, for pushbutton module 40 shown in FIG. 4, the digital I/O circuitry 102 provides a signal for illuminating pushbutton lamp 39 and receives a signal indicating whether the pushbutton 38 has been pressed. Pushbutton module 40 includes a physical operator, being the stem 108 of the pushbutton, which protrudes out of the housing of the control module 12 and may be pushed inward against the force of a spring 110. The internal end of the stem 108 incorporates a magnet 112 which, when the stem 108 is moved against a Hall effect detector 114 an electrical signal is generated. This signal is received by the I/O circuitry 102.

The various physical components incorporated into the control module 12 will change depending on the control module's characteristics. For example, for limit switch module 42, the lamp 39 will not be present and the push stem 108 may employ a radial motion as befits the actuator arm 43 on the limit switch. Likewise, the motor starter 52 will include circuitry for indicating the current flowing to the motor 36 and for providing a signal that the contact 78 should be opened if that current exceeds a predetermined amount. These physical signals indicative of the external aspects of the HDIC system 10 are received by the bus 92 via digital or analog I/O circuitry 102.

Each control module 12 may also include one or more status indicator LEDs 106, the latter generally indicating that the control module 12 is receiving power and that a program contained in ROM 94 has begun successful execution by the microprocessor 100 as is understood in the art.

Each control module 12 may also have an externally accessible switch 116 communicating six bits of digital information to the I/O circuits 102. This switch 116 permits each control module 12 to be assigned a unique node address that is used to identify messages transmitted from that module on communications medium 14 as will be described.

In summary, the microprocessor 100 may thus receive a stored program from the ROM 94, receive and transmit messages on the communications medium 14, actuate or detect the state of various physical components associated with that module such as pushbutton stem 108, lamp 39 and LED 106 and store and read certain variables employed during execution of the program in the ROM 94 within volatile RAM 96 or nonvolatile RAM 98.

Data Structures in Module Memory

Figure 7:
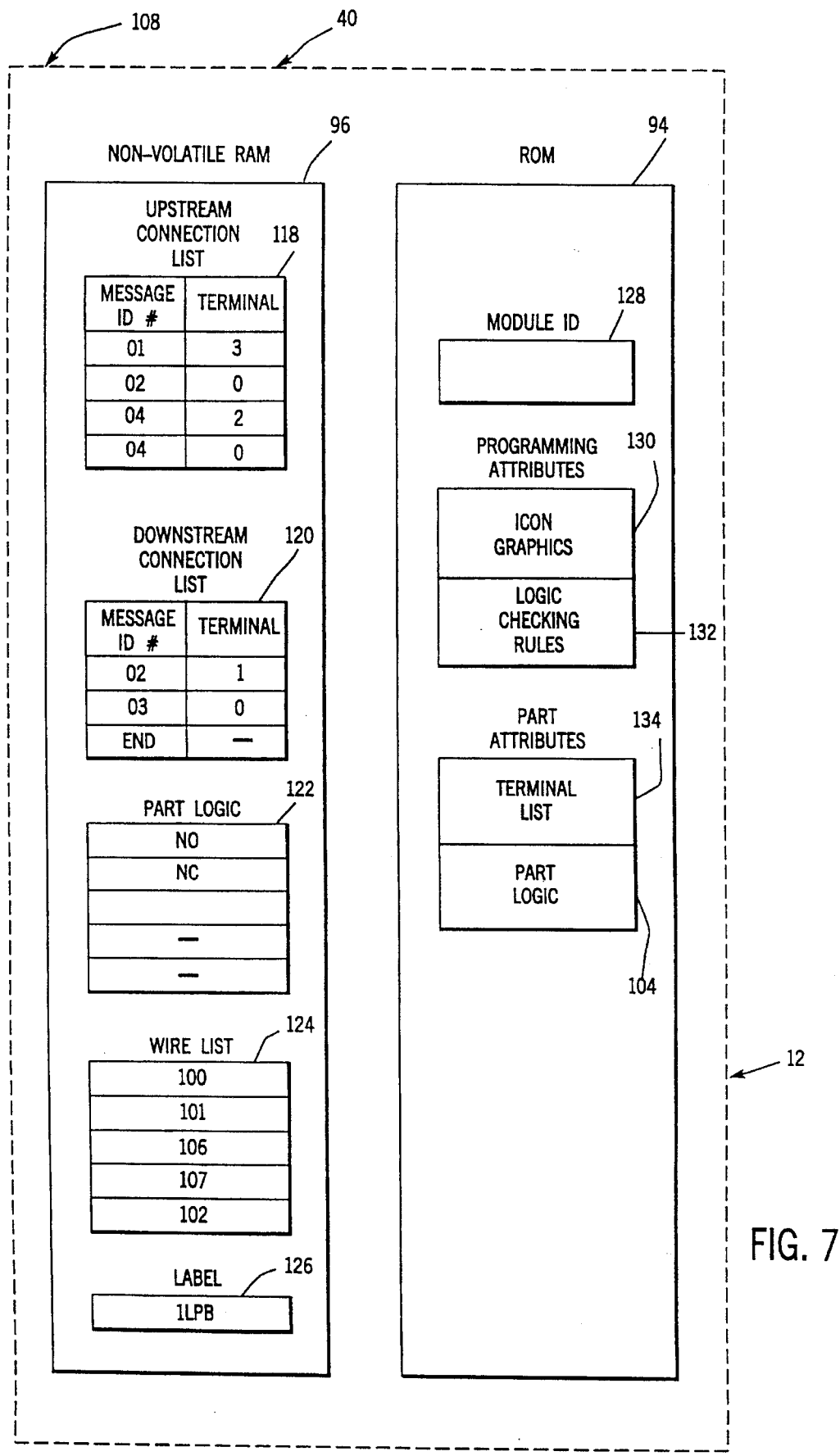
FIG. 7 is a more complete representation of the memory in each control module showing both the connection lists of FIG. 6 together with other data which defines the programming and logic attributes of the control modules.

Referring now to FIGS. 3 and 7, a portion of the nonvolatile RAM 98 holds an upstream connection list 118 consisting generally of a set of message identifiers of control modules 12 and part terminals 60' of specific parts in those control modules 12 that are (1) virtually connected to each given terminal 60 of control module 12 and (2) immediately upstream of the given control module 12. Part terminals 60' can be module terminals 60, as described above, or terminals of the part that have no connections outside of the module 12.

The message identifiers may be a combination of the node address of the module 12 containing the part terminal 60' and of an internally defined terminal address, dependant on the functionality of the module 12 and its number of part terminals. The message identifier allows a given part terminal 60' in a given control module 12 to be uniquely designated. Upstream connections are virtual connections which proceed directly, or have a path through wires 62 and other control modules 12, upstream to power source rail 74 following the conventions of current flow for the parts. Immediate upstream connections are those that are both upstream but directly connected by wires 62 to the given part terminal 60 without passing through other control modules 12. For a control module 12 emulating a simple switch, such as limit switch module 42, the upstream side is the side which would receive current flow in the physical realization the switch.

The upstream connection lists 118 thus describes each immediate upstream connection for each part terminal 60' of the given control module 12. If a part terminal 60' is connected directly to the power source rail 74, the message identifier of the circuit breaker 55 (01-3) is entered in the upstream connection list 118. If the part terminal 60' has no connections, no message identifier is entered into the upstream connection list 118. As will be described below, generally each control module 12 only responds to messages on the communications medium 14 originating from control modules 12 in its upstream connection list 118.

An optional downstream connection list 120, also found in nonvolatile RAM 98, in a manner analogous to the upstream connection list 118, may contain a set of message identifiers designating terminals 60 that are virtually connected to each part terminal 60' of the given control module 12 and which are immediate downstream neighbors to the given module 12. Downstream neighbors are those along a path of virtual connections ultimately leading to the power return rail 80. If a part terminal 60' is connected directly to the power return rail 80, the message identifier of the circuit breaker 57 (01-3) is entered in the downstream connection list 120. If the part terminal 60' has no downstream connections, no message identifier is entered into the downstream connection list 120. The given control module is largely indifferent to its immediate downstream neighbors except in repair mode as will be described below.

Figure 6:
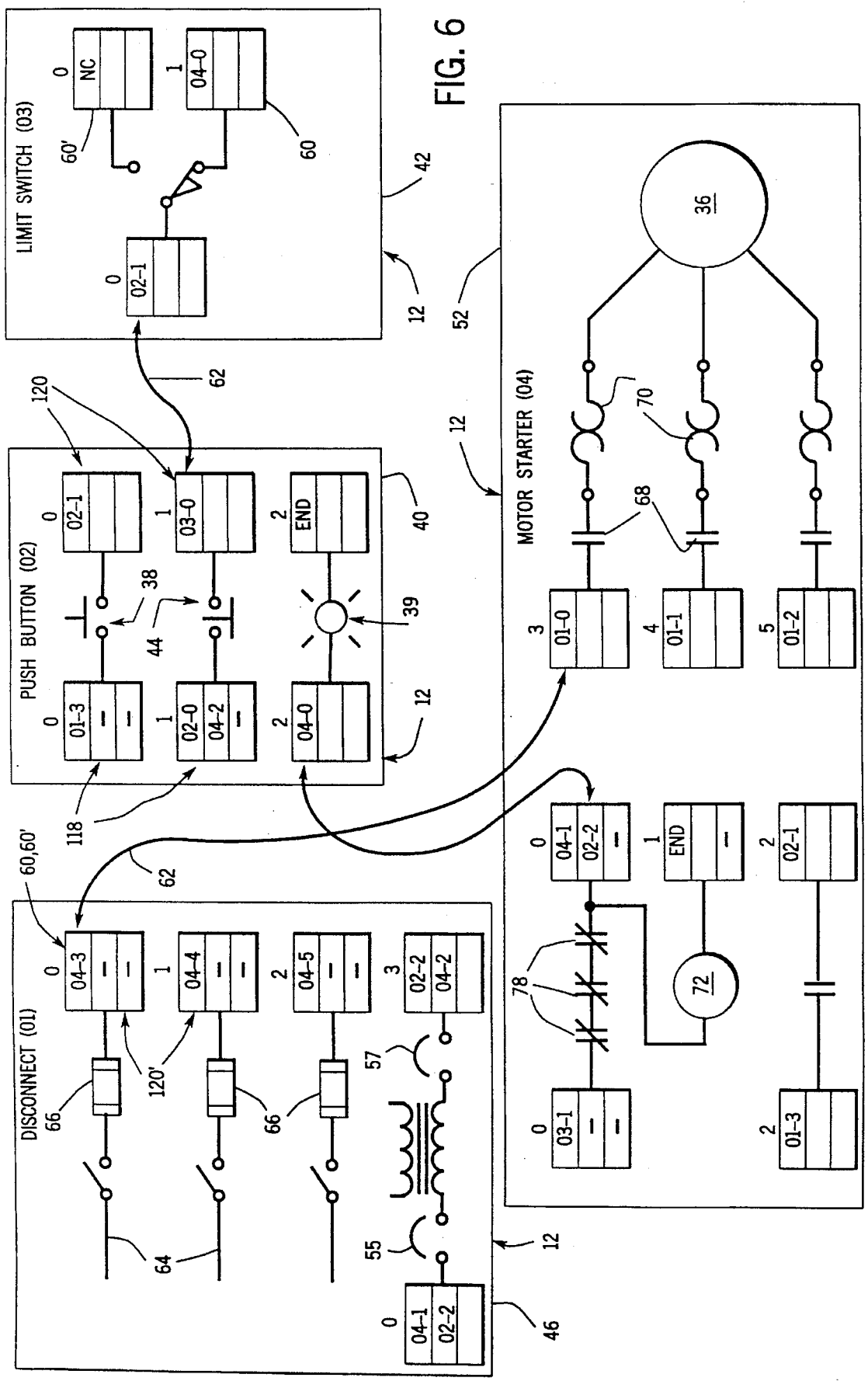
FIG. 6 is a simplified representation of the control modules of FIG. 1 showing their addresses and the contents of their connection lists which provide virtual connection between the control modules.

Referring now to FIGS. 4, 6 and 7, upstream connection list 118 and downstream connection list 120 serve to virtually connect each of the parts of each control module 12 to the other parts of the other control modules 12 independent of the actual network connection and in a manner that may be changed by simply reprogramming the upstream connection list 118 and downstream connection list 120.

Referring to FIGS. 3 and 6, and as described above with respect to the message identifiers uniquely identifying each part terminal 60', each control module 12 has a module address and each part terminal 60' of a part within the control module 12 has a terminal address. In the example of FIG. 3, the disconnect module 46 may have a module network address of 01, the pushbutton module 40 may have a module network address of 02, the limit switch module 42 may have a module network address of 03 and the motor starter module 52 may have a module network address of 04. Likewise, the terminals 60 within each control module 12 may be numbered sequentially by part. In the preferred embodiment, the input terminals are numbered sequentially from zero to the total number of input terminals and similarly the output terminals are numbered sequentially from zero to the total number of output terminals. For example, the input terminals of the disconnect module 46 may be given terminal addresses: 0, 1 and 2 and the output terminals, for corresponding parts of the disconnect module 46, may be given terminal addresses: 0, 1 and 2.

The input terminals 60 of the motor starter module 52, leading to contacts 68, may be virtually connected to the output terminals 60 of the disconnect module 46 by loading the message identifiers of those output terminals 60 into the upstream connection list 118 of the motor starter module 52. Thus, the connection list 118 associated with the input terminal for one input of the motor starter module 52 will have the message identifier 01-0 indicating that it is connected to control module 12 having module address 01 and to part terminal 60' having terminal address 0. This message identifier, so stored, creates a virtual link 62 between these two terminals 60.

In the preferred embodiment, virtual link is bi-directional. That is, the downstream connection list 120 for the disconnect module 46 also contains the message identifiers of its downstream neighbor in the motor starter module 52. Thus, the downstream connection list 120 for output terminal 0 of the disconnect module 46 contains the address 04-3 indicating that it is connected module address 04 (the motor starter) input terminal 3. Nevertheless, only the upstream connection memory is required for routine operation of the HDIC system 10.

A given part terminal 60' may be virtually connected to more than one other terminal by the multiple entries in the upstream connection list 118. For example, input terminal 1 of pushbutton module 40 which represents the upstream terminal of the pushbutton 44 is connected both to output terminal 0 of module number 02 and hence has an entry 02-0 in its upstream connection list 118 and to output terminal 2 of module 04 (the motor starter) and thus has an entry of 04-2 in its upstream connection list 118. As will be seen, multiple entries in the upstream connection list 118 for a given terminal effectively produces a logical "wired OR", meaning that the input terminal responds to signals from either upstream neighbor.

Similarly, the downstream or output part terminal 60' of any part may be connected to multiple upstream or input terminals of subsequent control modules 12. For example, the output terminal 60' of the set of normally-closed contacts 78 associated with motor starter module 52 is connected both to output terminal 1 of the motor starter module 52 and the input terminal of the coil 72 and also with the input terminal 2 of the pushbutton module 40 which is the upstream terminal of the lamp 39. This connection means that both control modules 40 and 54 consume signals from the output terminal 0 of the motor starter module 52. The connection of terminal 0 of the motor starter module 52 to terminal 1 of motor starter module 52, may not result in the generation of a message on the communications medium 14 but may be handled internally by the microprocessor 100 as will be described. Nevertheless, there is complete flexibility to connect any given downstream part terminal 60' to any other given upstream part terminal 60' either in the same or different control modules 12.

The present HDIC system 10 does allow certain rules to be imposed on the connections between control modules 12 based on the functionality of the parts of a control module 12. For example, rules may prohibit the connection of the power source rail 74 directly to the power return rail 80 causing a virtual short circuit. These restrictions, however, are not required by the above described interconnection system employing the upstream and downstream connection lists 118 and 120. In fact, such invalid connections may be used to check the operation of the virtual circuit breakers 55 and 57.

Referring again to FIG. 7, the nonvolatile RAM 98 also contains a part logic table 122 that allows for limited modification of the logic of the parts of the control module 12. The foundation part logic generally is contained within ROM 94 in a part logic data 104 defining the part logic. For example, the part logic for a pushbutton 38 is that when the pushbutton is in an "released" state, the output terminal of a normally open contact is "low" and when the pushbutton is in a "depressed" state, the output terminal has a value equalling the value of the input terminal. This fundamental logic may be affected by the part logic table 122, for example, by changing the interpretation of the position of the operator 108 with respect to whether the switch is in the normally open or normally closed states. That is, the switch may be programmed to be either normally-closed or normally-open. The variability of the part logic will depend on the parts included in the control module 12. For example, for a rotary switch, the variants of normally-open and normally-closed might be replaced with the variants of make-before-break or break-before-make. In a make-before-break switch, there is a shorting between adjacent throws during switching whereas in a break-before-make switch, adjacent throws are not shorted during the switching. The part logic table 122 may also contain threshold quantities, such as the thermal overload current at which the thermal overload element 70 in motor starter module 52 opens.

The nonvolatile RAM 96 may also store programming labels employed by a programmer in referring to both the parts and virtual connections during the programming of the HDIC system 10 as will be described in more detail below. One such programming aid is a wire list 124 which assigns "wire numbers" to the virtual connections between the given control modules 12 when displaying the virtual connections in schematic form. These wire numbers make the ultimate program of the HDIC system 10 more accessible to a human programmer by eliminating the complication of defining the virtual connections by terminal addresses which are device specific. This stored information will also allow for the programming terminal 20 to reconstruct the control program directly from the modules 12 connected in the system.

A module label 126, being a simple text string indicating the function of the control module 12, may also be stored in nonvolatile RAM. For the pushbutton 38 of the present example, the common designation of "1LPB" for first lighted pushbutton may be used. Both the numbers of the wire list and the label are essentially arbitrary with respect to the actual function of the control module 12 and are provided to the control module 12 during the initial programming and are required only if it is necessary to reconstruct the overall HDIC program in the form initially entered from its distributed portions as are ultimately contained with the various control modules 12 as the upstream and downstream connections lists.

The ROM 94 contains information that is not changed during the programming of the control module 12 and this includes a module ID number 128 which identifies permanent physical characteristics of the control module 12 such as whether it has a pushbutton operator 108 or a lamp 39. The module ID also enables the programming software for the entire HDIC system 10 to match the control module 12 with the module's programming attributes: such as its physical packaging icon and logic checking rules, as well as with other part attributes such as the number of terminals within the control module 12 and the part logic of each part. The actual programming and part attributes may be stored in the module 12, in the programming terminal 20 as loaded into the same by magnetic disk or other methods well known in the art.

Alternatively and in the preferred embodiment, these attributes are contained in ROM 94. In particular, programming attributes are contained in an icon graphics table 130 and in logic checking rules table 132 within ROM 94. The icon graphics table 130 holds a bit image of a symbol, such as one of those shown in FIG. 5, related to the function of the parts within the control module 12. Preferably, at least two distinct icons are available for each state of each part of control module 12 as well as an icon depicting the control module 12 as a whole. This latter whole control module icon is "opened" as will be described below, to display the parts icons. With regard to the parts icons, for example, both opened, closed and faulted symbolic representations of a switch part may be contained in the icon graphic table 130. These images of the icon graphic table 130 may be loaded up into a programming terminal 20 as will be described below.

A second table 132 of programming attributes includes logic checking rules are routines that allow the programmer to detect improper connections of the parts of the given control module 12 to other parts. For example, a coil part such as coil 72 should not be shunted by a virtual connection from the input to its output terminal. If such a connection is made, the virtual circuit breakers 55 and 57 will open.

The part attributes of the parts within control module 12 are preferably also stored in ROM 94. Principal among these are the terminal address of the parts as held in a terminal list 134. The terminal list 134 provides how many terminals are within the control module 12, their addresses, whether they are input terminals or output terminals and what logic is associated with them. For example, for pushbutton module 40, the terminal list 134 would indicate that there are six instances of terminals referenced 0 through 5 where terminals 0 are a switch, 1 are a switch, and 2 are a lamp. This permits the programming terminal 20 to display the appropriate number of terminals and orientation of terminals for programming by the user. Intimately related to the terminal list 134 is the part logic table 104 which provides the programming terminal with an indication of the function of the various parts through their logic.

As will be described below, however, despite the grouping of parts within modules 12, all parts contained within the module 12 are presented to the user as independent elements in a traditional "bill of materials" and the user has complete freedom to interconnect the parts without regard to the actual modules 12 containing the parts.

Programming of the HDIC System

Figure 8:
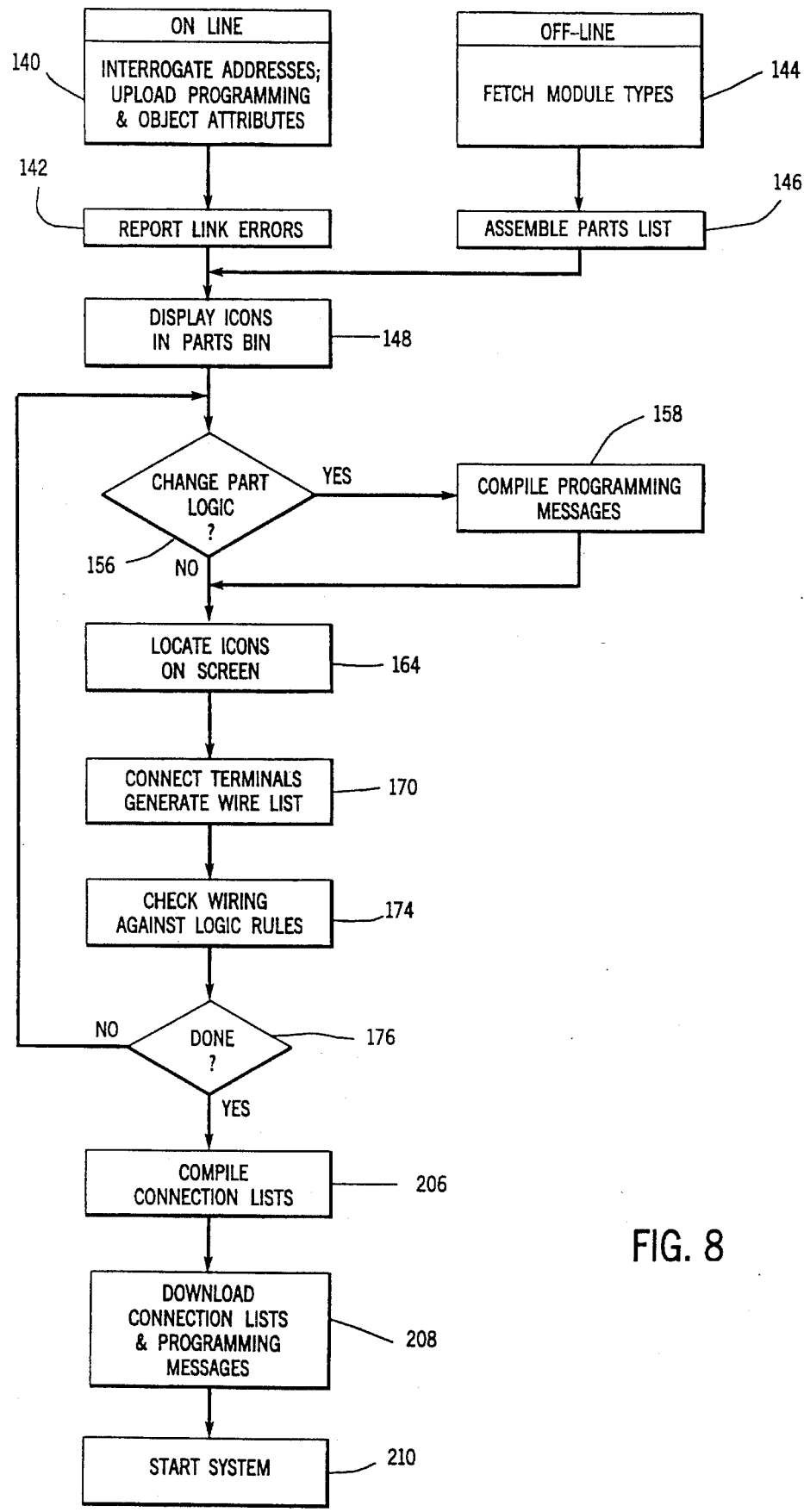
FIG. 8 is a flow chart of the operation of the programming terminal of FIG. 1 such as is used to program the control system of the present invention and to allocate and download that program among the various modules.

Referring to FIGS. 1, 7 and 8, the initial programming of the HDIC system 10 may be performed either 1) "on-line", via the programming terminal 20 as connected to the communications medium 14 or, 2) "off-line" with the programmer designating the hardware connected to the network in the desired control system. Generally no particular order is enforced for the off-line programming steps to be described, however, for simplicity they are depicted and explained according to a linear progression from initial configuration to compilation and downloading. The programmer employs programming software contained in the programming terminal 20 to define the control program for the particular application. The control program is created interactively by constructing a schematic from icons representing the parts available within or downloadable to the various control modules 12. After the program is completed, it is divided into portions that may be allocated to the individual control modules 12, after which the programming terminal 20 may be removed and the program may be executed without centralized coordination of the various control modules 12.

The first step of the program is the hardware configuration mode in which the necessary parts and/or modules are determined or selected. Two principal configuration methods may be employed depending on whether on-line or off-line programming is employed as decided by the user.

In on-line programming, indicated generally by process blocks 140 and 142, particular control modules 12 are first selected and installed on the communications medium 14 and only the parts that may be implemented by those control modules are available for programming. Each control module 12 is given a separate unique address by means of its dip switch 116. The programming then interrogates the communications medium 14, as indicated by process block 140 to determine the particular control modules 12 that are attached to the communications medium 14 and their characteristics.

To make the interrogation, the programming terminal 20 may send sequential messages to the control modules 12, each message having a sequentially different address until all possible addresses have been identified. As will be described below, the control modules 12 are programmed so as to respond only to any messages destined for their own address. Upon receipt of such a properly addressed message, the control module 12 responds with its module ID 128, its icon graphics 130, its logic checking rules 132, its terminals list 134, its part logic 104, and any other necessary information. This identifies the parts in a "parts bin", being parts that the programmer can work with to construct the necessary control program. After completion of the interrogation, at process block 142, the programming terminal 20 provides a display of possible network errors, for example, where two or more control modules 12 have the same address.

Alternatively, in the second off-line configuration method, and as indicated by process blocks 144 and 146, the programming may be undertaken without the connection of any control modules 12 to the communications medium 14 and all parts known to the programming terminal 20 are available for programming. In this case, the programmer is prompted, as indicated by process block 144, to enter the desired types of control modules 12 into the programming terminal 20 and the necessary programming and part attributes for those control modules 12 are obtained from a library of module data contained, for example, on a magnetic disk within drive 30. From this selection, at process block 146, the program next compiles a parts list of available parts for programming.

In either case, at process block 148, the programming terminal displays an indication of the modules 12 that may be used in the program.

In a variation of the off-line configuration method, the user can select parts themselves, rather than modules 12 at process block 114. Various modules 12 that support the desired parts are then presented to the user. In this embodiment, the user need not be immediately concerned with the implementation of the parts within actual modules 12.

Figure 10:
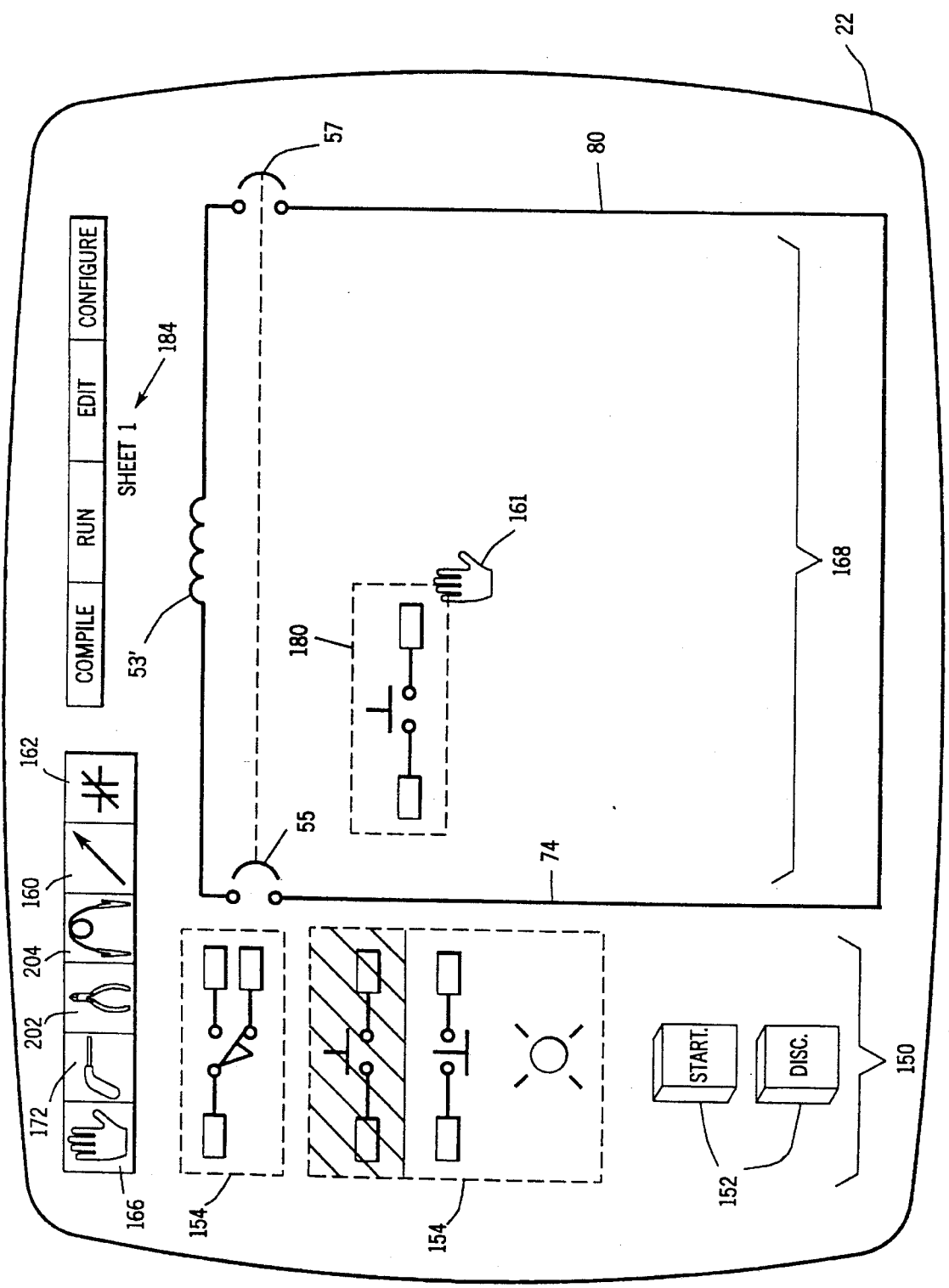
FIG. 10 is a screen display such as may be seen on the programming terminal of FIG. 1 showing a parts bin of control modules and parts of control modules as found in FIG. 5 and various programming tools as may be used to generate a schematic.

Referring also to FIG. 10, in all cases the available parts are displayed in a parts bin area 150 of the display screen 22 of the programming terminal 20. The parts bin is the leftmost section of the screen.

The module icons 152 generally represent the outward aspect of the control modules 12 without indicating the parts within the control modules 12. Module icon 152 may be "opened" by a selection from the programmer through the keyboard 26 or mouse 28, to reveal the various parts incorporated within the control module 12 each indicated by parts icons 154. Each part icon 154 is represented by a functional symbol having one or more input and output terminals such as collected in FIG. 5.

The program may next proceed to an off line editing mode where the displayed parts may be arranged within a programming area 168 of the display screen 22 to the right of the parts bin 150 and connected together. Each of the stages of the editing mode may be repeated an arbitrary number of times until the editing is complete.

After a control transformer 53' and associated circuit breakers 55 and 57 are selected, the programming area 168 is flanked by a vertical power source rail 74 on the left, indicating a source of power, and a vertical power return rail 80 on the right, indicating a power return. If the user does not want the logic of the parts to execute, as it is edited, the circuit breaker pair 55, 57 may be left open.

In one stage of the editing process, the part logic for the parts in the parts bin 150 may be changed. For example, in a switch part, the normally-closed contacts of the switch might be changed to normally-open contacts. A part logic change may be implemented by using the mouse 28 to move a cursor to a selection tool 160 (an image of an arrow) on the display screen 22. This selection tool 160 replaces the cursor and is moved to the particular part icon 154 whose logic is to be changed so that the part icon 154 becomes highlighted. A change logic button 162 is then activated by the mouse 28 or a selection on a pull down menu is made to change the part logic.

If a part logic change is desired as determined at decision block 156, the program may compile programming messages to be later sent to the control modules 12 into the part logic table 122 of nonvolatile RAM 98 and as indicated by process block 158. The part logic table 104 contained in ROM 94 circumscribes the various changes in logic permitted for a given part. When the logic of a part has changed, the part icon 154 displayed in the parts bin 150 or schematic 168 changes to reflect the changed functionality. The setting of "user desired menu defaults" is accomplished in this way.

In another stage of the editing mode, as indicated by process block 164, the various part icons 154 are positioned at various locations in the programming area 168. This positioning of icons is performed with the mouse 28 after selection of a location tool 166 which replaces the mouse controlled cursor 161 on the display screen 22 and which may be used to "pull" the necessary part icon 154 to a desired location in the programming area 168 of the display screen 22. There are no limitations as to where the particular part icon 154 is located within the programming area 168 and thus the placement of the part icons 154 may conform to the rules of conventional schematic practice. Further, each part icon 154 within a given control module 12 may be located at different places within the programming area 168 to conform with the dictates of readability and ease of understanding. Placement rules, dependent upon the part selected or as defined by the user, may be invoked in process block 174 to assist in this process. The programming area 168 may be "scrolled" vertically and horizontally, as is generally understood in the art so as to provide essentially unlimited room for part icons 154. The scrolling of the programming area 168 divides the programming area 168 into "sheets" with the number 184 of a given sheet being displayed shown, for example, in the upper right hand corner of the programming area 168.

While in the editing mode, as the part icons 154 from the parts bin 150 are placed in the programming area 168, the terminals of the positioned part icons may be connected to each other or to the power or power return rails 74 and 80 as would be electrical symbols on a schematic. This connection may be performed by selecting a wiring tool 172 (an image of a wire wrap gun) for the cursor 161 and moving the cursor via the mouse 28, in turn to each pair of terminals of the part icons to be connected. The connections are indicated by wire lines drawn on the display screen 22 between the connected terminals. As the connections are made, the connection is compared against the logic checking rules 132 (FIG. 7) uploaded from ROM 94 to insure that proper connections are being made and to provide feedback to the programmer, on a near real-time basis, of any programming errors. This process of checking the wiring is indicated by process block 174. Connections may be moved or deleted by employing the wiring tool 172 over the offending connection.

Terminals 60 of any given part icon may be connected to icons on different sheets by using the wiring tool 172 to make the first connection on the first sheet and then paging to another sheet and making the second connection. Visually these connections are designated on the display screen 22 by a line leading to a symbol which indicates the sheet and line number at which the other end of the wire will be found.

The steps of changing part logic of process block 158, locating the part icons 154 on the screen of process block 164, connecting the terminals of process block 170, and checking the connections of process block 174 may be repeated until the desired control schematic is obtained. This is indicated generally by the loop formed within the decision block 176 querying whether the off-line editing process has been complete and if not, returning the programming to the top of process block 156 to perform the operations of process blocks 164, 170 or 174 in any order.

The schematic so produced records the desired logic of the HDIC system 10 as a set of wire interconnections between parts having particular part logic. The program for the HDIC system 10 is then primarily the schematic, and the programming language of the HDIC system 10 is comprised of a set of instructions that, in the described example, are standard electrical parts, such as switches and lamps, and the wiring between parts. The use of this programming "language" in which the logic is diffusely contained in standard electrical parts and their interconnections, provides the advantage of employing the well understood and highly evolved electrical schematic standards such as promulgated by JIC, NEMA, IEC and others and further, as will be apparent, provides a simple and intuitive solution to the problem of efficiently allocating a program among many distributed processors, such as is represented by each control module 12.

As the terminals of the part icons 154 are connected, as indicated by process block 170, a wire list, ultimately to be downloaded into the wire list table 124 in nonvolatile RAM 98 is generated. The wire list may be created using various assignment rules. This example assumes that the rule selected provides a sequential integer wire number for each wire connection between terminals of the parts icons 154 to simply identify that wire. The wire numbers are independent of the actual physical implementation and products used and depend rather on the location of the icons for each part on the display screen 22 and thus are convenient for the programmer. Table I shows a wire list for the HDIC system 10 of FIGS. 1, 2 and 6, and associates a wire number with pairs of message identifiers. The wire number is assigned, except for jumpers (to be described), based on the position on the screen.

TABLE I

| Wire Number | Upstream Terminal | Downstream Terminal |
| --- | --- | --- |
| 100 | 01–3 | 02–0, 04–2 |
| 101 | 02–0, 04–2 | 02–1 |
| 102 | 02–1 | 03–0 |
| 103 | 03–0 | 04–0 |
| 104 | 04–0 | 04–1, 02–2 |
| 105 | 04–1 | 01–3 |
| 106 | 04–0 | 01–3 |

Note that wire numbers are only produced for connections between parts that may be separately connected. Wire number 101 which has two upstream connections implements a "wired-OR" function responding to either of its two upstream paths. Once an off-line editing session is complete, as determined at decision block 176, the program enters a compilation mode. In the first stage of the compilation, indicated by process block 206, the program examines each part in the programming area 168 and identifies the connections of each upstream or input terminal to downstream or output terminals of parts of other upstream control modules 12. The terminal and module message identifiers of those connections are employed to create the upstream connection list 118 for the control module 12 holding that part. Likewise, the downstream connections from each downstream or output terminal of a part, to the upstream or input terminals of parts of other control modules 12 are optionally collected to create the downstream connection list 120 for the control module 12 holding that part.

The upstream and downstream connection lists 118 and 120 for each control module 12 are downloaded via the communications medium 14 to the respective control modules 12 as indicated by process block 208. Also, programming messages generated in process block 158 as described above and indicating changes in the logic of particular parts are downloaded to form the part logic table 122 shown in FIG. 7. The wire lists 124 and labels 126 generated during the programing of the HDIC system 10 are also downloaded. This downloading may occur after completion of the editing as depicted or during the editing, if desired.

At the conclusion of the editing, the HDIC program may be run by closing the circuit breaker pair (55,57). This causes the broadcast of a run command along the communications medium 14 as indicated by process block 210. The system may also be edited within operation, or while any combinations of modules or icons are operational or entirely off-line (with the circuit breakers open) as described above.

An Editing Session

Referring again to FIGS. 10 and 11, for the HDIC system 10 shown in FIG. 1, the schematic of FIG. 11 may be constructed on the display screen 22 from control modules 46, 40, 42 and 52 represented in the parts bin 150 by module icons. Initially, the pushbutton module icon may be opened to reveal the pushbutton parts including normally-open pushbutton icon 180 corresponding to pushbutton 38. The mouse 28 and location tool 166 (the image of a hand) are then used to slide the pushbutton icon 180 from the parts bin 150 to the programming area 168. The pushbutton 180 may be located anywhere within the programming area 168 but based on its logical relationship to the other parts of other control modules 12 and the convention of current flow from power source rail 74 to the power return rail 80, pushbutton icon 180 is positioned toward the left of the programming area 168 near the power source rail 74.

Figure 11:
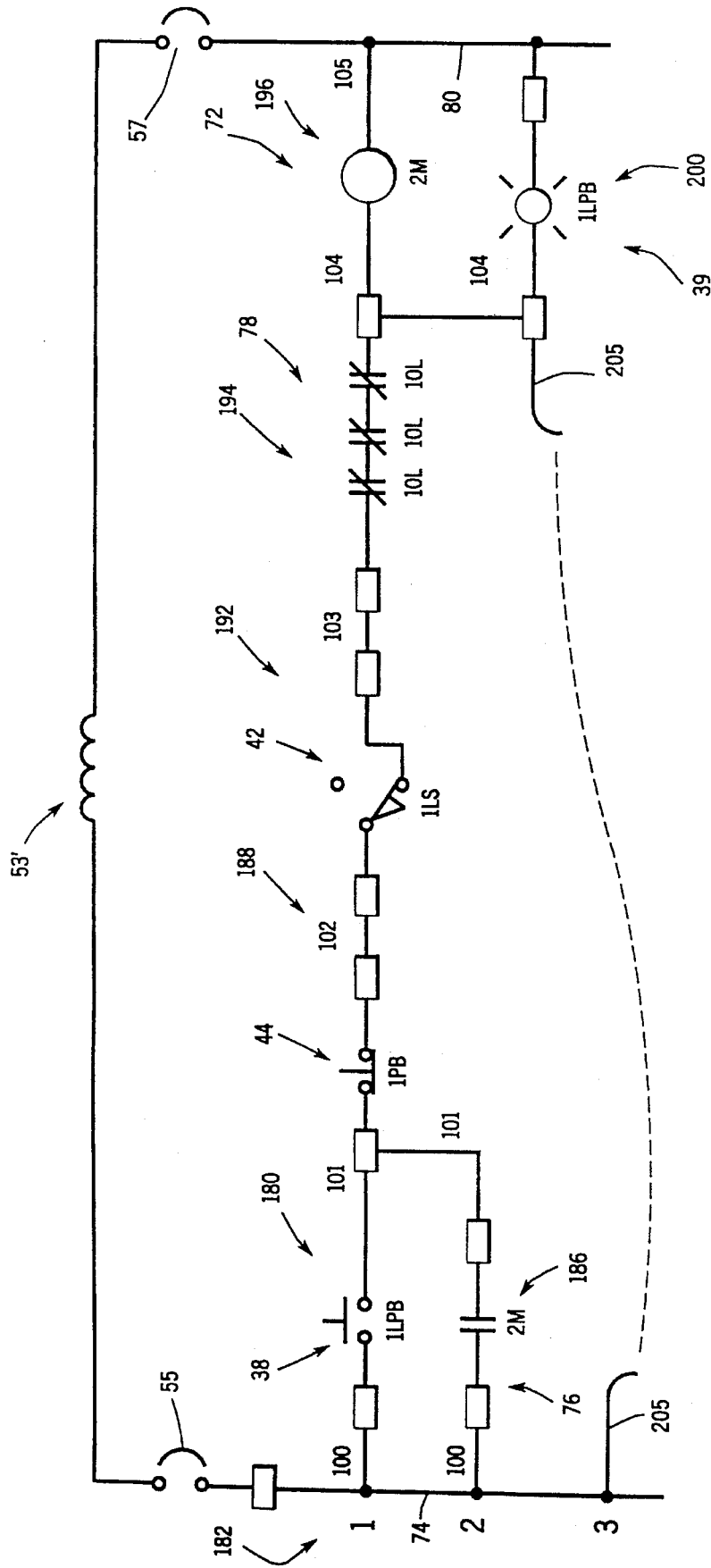
FIG. 11 is the completed schematic of the control logic for the highly distributed industrial control of FIGS. 1 and 3 as displayed on the screen of FIG. 10 and as is used to generate the necessary connection lists and wire lists for the control system.

Once the icon 180 is positioned, its leftmost terminal may be connected to the power source rail 74 by use of the wiring tool 172 as previously described. Referring to FIG. 11, once the connection between the leftmost terminal of the pushbutton icon 154 is made, a line with wire number 100 appears immediately to the right of the power source rail 74 indicating that connection. The connection of the leftmost terminal of the pushbutton icon 180 to the power source rail 74 also causes the pushbutton to be labeled in this case as one LPB (first lighted pushbutton). The numbering of the wire connections and parts follows any of various standard industrial practice for schematics and may be according to the position of the connection and part on the schematic sheet display (FIG. 11) as denoted by numbered lines 182.

In further programming the HDIC system 10 for the application of FIGS. 1 and 2, the part icon 186 (FIG. 11) representing the normally-open contact 76 in the motor starter module 52 may be connected in parallel with the pushbutton icon 180. Thus, still referring to FIG. 11, the icon 186 for the normally-open auxiliary contacts of the motor starter module 52 may be dragged to a position beneath the icon 180 of the lighted pushbutton and the wiring tool 172 selected to connect the leftmost terminal of the icon 186 to the power source rail 74.

Next, the part icon 188 of the normally-closed pushbutton 44 of the pushbutton module 40 is moved to the right of the part icon 180 and the upstream terminal of this icon 188 is connected to the rightmost terminal of the icon 180 with the wiring tool 172. At this time, the wiring tool 172 may also be used to connect the rightmost terminal of icon 186 to the leftmost terminal of the icon 188.

The programming schematic of FIG. 11 may continue to be constructed by next selecting the part icon 192 corresponding to the limit switch module 42 and connecting that downstream of icon 188. Again, as this icon is connected it is labeled "1LS" indicating the first limit switch. The part icon 194 is constructed by iteratively selecting three normally-closed contacts 78 and then connecting their left terminal to the rightmost normally-closed terminal of the icon 192. A part icon 196 representing the coil 72 of the motor starter is connected between the rightmost terminal of the three normally-closed contacts 78 and the power return rail 80 thus completing one rung. Finally, a part icon 200 representing the lamp 39 from the lighted pushbutton is connected so as to shunt the actuator icon 196, that is, its leftmost terminal is connected to the rightmost terminal of the three normally-closed contacts of icon 194. The rightmost terminal of the lamp 39 is connected to the power return 80. At this point, the programming is complete.

The editing mode may be reentered at any time and may be used for troubleshooting purposes. For example, a force-off tool (the image of a wire cutter) or a force-on tool 204 (the image of a jumper) may be used by the programmer to establish and mark temporary connections. For example, for the purpose of troubleshooting the program, it may be desired to temporarily connect the lamp 39 of the lighted pushbutton directly across the power source rail 74 and power return rail 80. This connection would establish that the light was in fact working. Following the convention described above, the connection may be made by using the force-on tool 204 to connect the power source rail 74 to the leftmost terminal of the lamp 39. This connection would be indicated by a curved yellow line rather than straight red line on the display screen 22. After this connection, instead of removing the line indicating a wire through the use of wiring tool 172, any wire may be cut using cut tool 202. This leaves two dangling wire symbols 205 joined by a dotted line so as to mark the location of that jumper used to force the lighted pushbutton on for possible future use.

Returning now to FIG. 10, any of the modes of configure, edit, compile and run may be invoked by activating a visual "button" displayed above the programming area 168. Activation of such a button causes the program to proceed to the process blocks previously described with respect to that mode.

Operation of the Control Modules

Figure 9:
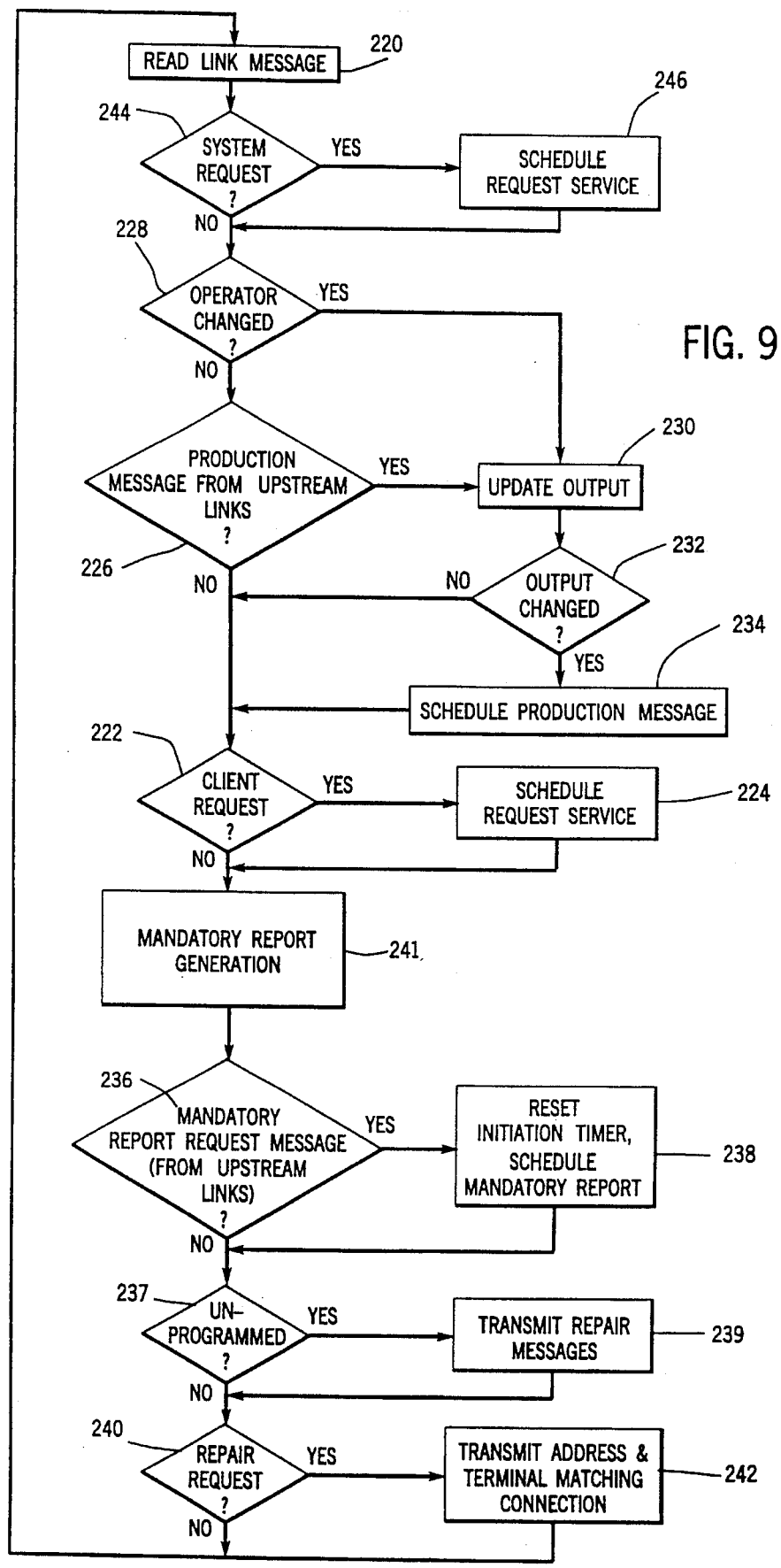
FIG. 9 is a flow chart of the operation of a control module of FIG. 1 showing its response to various messages on the network including those from other modules and from the programming terminal.

Referring to FIGS. 4, 7, and 9, each control module 12 upon receipt of power from communications medium 14 runs a program as stored in its ROM 94. For clarity the program is depicted as a continuous loop, however it will be recognized to those of ordinary skill in the art that other program architectures may be employed to accomplish the functions herein described.

If the link controller 86 is realized as a separate circuit from microprocessor 100, then, concurrently with this program the link controller 86 monitors messages on the network and, on an interrupt basis stores relevant messages in a buffer area of volatile RAM 96.

The program periodically checks volatile RAM 96 for buffered messages received from the communications medium 14 as indicated by process block 220. At this time the status of any operator 108, such as a pushbutton, is also determined and stored as a flag in the volatile RAM 96.

At decision block 244, any buffered message is examined to see if it is a high priority system request message (such as may request an "all stop" from the module 12 which stops control action) as indicated by a unique message header (an arbitration field) and an embedded message identifier matching the module address of this control module 12. The request also designates specific actions required of the control module, such as its resetting.

In any case, the program next proceeds to decision block 226 at which the buffered message is examined to see if it is a production message having an message identifier on the upstream connection list 118. Production messages are output messages from other control modules 12 to which some part of the receiving control module 12 is virtually connected. For example, if the control module 12 is the pushbutton module 40, a message from the part representing contact 76 in motor starter module 52 would be reacted to by the pushbutton module 40. In this case, the operator status, that is the status of the pushbutton, would be checked by means of the flag in volatile RAM 96 as indicated by process block 228.

Next, at process block 230, based on the particular production message and the operator's state, the program, referring to the part logic contained in ROM 94, updates an output state for that part representing the value of a downstream terminal of that part, and stores that state in a table in volatile RAM 96. As the table is updated, its previous contents are checked, at decision block 232, to see if the given output has changed in the updating, and if so, at decision block 234, the control module 12 transmits its own production message(s) with its own message identifier for the benefit of other downstream control modules 12. A production message is transmitted only if the output has changed, not if only the operator state has changed, thus conserving network capacity. Like process block 246, this transmitting need not occur at this time but may simply be scheduled for handling with other communications tasks at a later time Nevertheless, it will be understood to those of ordinary skill in the art that if the network capacity is sufficient, an output message can always be transmitted. Further, if the output has not changed but the control module 12 is in a diagnostic mode as determined by a flag set at process block 224 as described above, then a production message is transmitted. In the diagnostic mode, the output states are constantly transmitted on a communications medium 14 so that the display on display screen 22 may be constantly updated providing a real-time view of the operation of the entire HDIC system 10. This approach also helps emulate worst case network loading in the actual system.

These steps of 226 through 234 represent the core of each control module's 12 operation and require of the control module only that it may identify the message identifiers of any upstream parts connected to the control module 12. The control module 12, for its primary functioning, is indifferent to the downstream virtual connections.

The portion of the industrial control program that must be allocated to each individual control module 12 is thus primarily a set of upstream message identifiers establishing the virtual connections from the control module 12 to upstream control modules 12. These virtual connections and the part logic contained in ROM table 104 are the program executed by each control module 12.

At decision block 222, the buffer area of RAM 96 is examined to see if a "client" message has been received. If so and if the address of the client message matches the node address of the receiving control module 12, then the control module 12 services the client request.

One client message request is the uploading of personality data from the module's nonvolatile RAM 98 or ROM 94. In one embodiment, icon graphics 130 and the logic checking rules 132 as well as the terminal list 134 and module ID 128 may be uploaded. The contents of the nonvolatile RAM 98 including the wire list 124 and label 126 may also be uploaded for the purposes of recreating the program operating on the highly distributed network if the original source code is not available and must be reconstructed. In response to a valid and properly addressed upload request message, as tested at decision 244, the control module 12 uploads on the communications medium 14 the requested data, at process block 246. This uploading need not occur at this time but may simply be scheduled for handling with other communications tasks at a later time An example of another client message is programming message which will download the contents of upstream connection list 118, downstream connection list 120, part logic table 122 or wire list 124 or labels 126, to that module 12, as previously described. This downloading to the control module 12 is indicated by process block 224. At process block 224, the control module 12 may also receive a troubleshooting status message which sets a diagnostic mode flag bit in volatile RAM 96 as will be used below.

As mentioned, in the preferred embodiment, production messages are only transmitted if the output of a part in the control module 12 changes. For control purposes, the only time a message is produced is when the module's output, feeding downstream modules, is affected. This procedure conserves network capacity but creates the risk that a failed control module 12 will not be detected. Various methods, like message watchdogging, may be used to detect faulted modules and/or program logic. However, to reduce module complexity even further, fault detection and action is, in the preferred embodiment, performed solely by circuit breakers, actuators or output modules such as in the disconnect module 46. Thus, the ability to generate a mandatory report message per process block 241 is implemented only is some control modules 12.

In those modules 12 in which mandatory reporting is implemented, a mandatory report initiation message is broadcast to all modules 12 at a predetermined interval, per process block 241. The interval between such initiation messages is selected to be long enough to not unduly tax the network capacity by its addition of periodically repeated transmissions.

In response to the mandatory report initiation message, parts in modules 12 connected to the power source rail 74, transmit a mandatory report message to their downstream neighbors listed on their downstream connection lists 120, such message including the current output state of the parts but not causing any change of state of the downstream parts as would be the case with a conventional output message. Each downstream neighbor receiving a properly addressed mandatory report message also transmits a mandatory report message so that the report message ripples downstream.

The part originating the mandatory report initiation message also starts an initiation timer and then "listens" for the completion of the ripple-through of mandatory report messages as reflected in the originating part's receipt of a mandatory report request from its upstream neighbors. In the mandatory reporting process, each immediate upstream neighbor of a part must transmit a mandatory report message to that part for that part to transmit its own mandatory report message to its immediate downstream neighbors. Thus, upstream terminals of a part having more than one connection other parts, which terminals normally operate as logical OR's (responding to any one of the upstream parts) act like logical AND's for the purpose of mandatory report messages (responding only to all of the upstream parts together). Thus, if the initiating part is circuit breaker 57 connected to power return 80, the mandatory reporting will be considered complete only if every rung connected to power return 80 provides a mandatory report message to circuit breaker 57.

If the mandatory report ripple-thorough is not complete before expiration of the initiation timer, a fault condition is indicated. The originating part may then take action, for example by opening the circuit breaker to disconnect the rungs.

The mandatory report message allows status of every part of every control module 12 on a given path from the power return rail 80 to the power source rail 74 to be established thus updating the state of the system and confirming that the parts of all of the control modules 12 are connected. This status may be confirmed and displayed via the attached programming terminal 20. This technique will validate that all serial, parallel and feedback paths are intact and executing.

Thus, decision and process blocks 236 through 241 provides a method of protecting against failures of a given control module 12 or a break in their virtual connections. Importantly, however, a failure of a given control module 12 or part within that module may be easily isolated by this procedure. In contrast, generally a failure of a component of a centralized controller prevents such easy troubleshooting. Further, as mentioned, the only modules requiring "watchdog functionality" and fault action behaviors are output and actuators, not all network devices.

In the event that a given control module 12 is damaged or fails, as detected by the mandatory report message procedure described above, or by means of its status light 106 or by obvious outward signs of damage, then the damaged control module 12 may be replaced and the HDIC system 10 reprogrammed to replace the portion of the program residing in the damaged control module 12. The control module 12 selected to replace the damaged control module 12 must support the appropriate parts and may be programmed by an external device such as the programming terminal 20 as to certain personality traits. After the network address has been set to the address of the damaged control module 12, the reprogramming may be accomplished via the programming terminal 20 which simply recompiles the program (as saved on disk) and downloads the necessary programming information to the various control modules 12 as during the original programming procedure.

Alternatively, the reprogramming may be accomplished without the programming terminal 20 but by means of the other control modules 12 which contain the necessary information to reconstruct the missing program in the repaired control module 12. Specifically, as indicated by decision block 237, each control module 12 is programmed so that if it detects production messages on the communications medium 14 and yet has no addresses in its upstream connection list 118 or downstream connection list 120, and hence presumably is a replacement module, then it transmits a series of repair request messages, per process block 239, indicating the message identifiers of the terminals of its parts.

As indicated by decision block 240, if a control module 12 receives a repair request having a message identifier in its upstream connection list 118 or downstream connection list 120, then the control module 12 transmits the message identifier of its associated terminal to which the match was found, along with whether the match was in the upstream connection list 118 or downstream connection list 120. From this data, the repaired control module 12 may reconstruct its own upstream connection memory and downstream connection memory and thus may reconnect itself to the network.

The repaired control module 12 may not contain the various user convenience information like the wire list or the label for the control module 12. However, these pieces of information are required only for viewing the program on the display screen 22 and thus are not required to return the system to an operational state. Alternatively, the necessary additional programming information such as part logic table 122 may be stored in neighbor modules 12 to permit complete reprogramming.

Operation of the HDIC system

Referring now to FIG. 11, prior to the start of the conveyor belt 32, the operator of pushbutton 38 will be up, disconnecting the terminals of that switch and contact 76 will be open. When pushbutton 38 is closed, the control module 12 executing the program of FIG. 9 directly updates the output of the pushbutton, as necessary according to the part logic 104, because the upstream terminal of the pushbutton is connected to the power rail. That is, in this situation, when the pushbutton operator is actuated, the output will necessarily change because it is directly connected to the power source rail 74 whose circuit breaker contacts are closed.

A production message may be transmitted on the communications medium 14 even though the only downstream connection to pushbutton 38 is contained within the module 40. This reflects a philosophy that control modules 12 may be indifferent to their downstream neighbors except for certain special messages such as the mandatory report message or the repair request message. Further, this transmission of internal virtual connections allows the monitoring of the network by the programming terminal 20.

Alternatively, in a second embodiment, prior to transmission of any production message on the communications medium 14, the program may check to see whether its output is connected to any externally produced terminal 60. If not, it will suppress the network transmission and begin evaluating the logic for any connected parts in that same control module 12.

At the start of the conveyor, pushbutton 44 will be in a closed state and therefore its output will also rise, resulting in a production message being transmitted on the network with the message identifier consumed by the limit switch 42.

The transmitted message from module 40 will be received by limit switch module 42 which, because it is also in a closed state, will transmit a production message indicating a change in the state on its produced terminal. This production message will be received by normally-closed contacts 78 within the motor starter module 52, energizing coil 72. Because the normally-closed contacts 78 are initially closed, their output will change as well as the "state" of wire 104 initiating yet another production message on the communications medium 14.

This production message will be received the lamp 39 of the pushbutton control module 40. Lamp 39 has its downstream terminal connected to the power return rail 80 and a production message is generated. The activation of coil 72 closes contact 76 and thus one final message is initiated by the output of contact 76 indicating that it has closed. Since the arrival of this message via wire 101 does not change the state of the output of the pushbutton 44 at wire 102, the pushbutton module 40 does not produce another message.

Thus, the operating HDIC system 10 mimics the actual current flows through standard electrical parts as represented by the parts of the control modules 12 by means of production messages transmitted on the communications medium 14.

HDIC Applied to a Ball Metering System

Hardware

Referring now to FIG. 12, an industrial controller 300 may be designed to control the release of balls 302 through a tube 304. A large supply of balls 302 are held within a hopper 306 which funnels down at its lower end to the upper opening of the tube 304 which permits the entry of a single ball 302 from position (a). The ball 302 is then stopped in the tube 304 at position (b) by a pawl 308 attached to a solenoid 310.

Upon the pressing of a LOAD pushbutton 312 for a predetermined minimum period of time, a lamp 313 is lighted and the solenoid 310 is actuated to retract the pawl 308 from the interior of the tube 304, allowing the ball 302 to drop down the tube 304 from position (b) to position (c), the latter position being further into the tube 304. The ball 302 is stopped at position (c) by a second pawl 314 attached to a solenoid 316.

In position (c) above pawl 314, the ball 302 may be sensed by a proximity switch 318.

A RELEASE pushbutton 320, if pushed, lights lamp 322 and retracts pawl 314 via solenoid 316 releasing a single product 302—if a signal indicating the presence of a product 302 at pawl 314 is provided by proximity switch 318.

The above described system 300 requires a number of elemental functions: pushbutton switches, lamps, solenoids, a proximity switch, and a filter function that ensures that the LOAD pushbutton has been pressed for a given period of time. These elemental functions will not necessarily each be assigned to a separate module for implementation—rather efficiency, cost, and spatial constraints will dictate that some elemental functions will be grouped together for implementation by a single given module.

For example, inputs from human operators, in the form of pushbuttons 312, 320, and outputs to the operator in the form of lamps 313, and 322 are logically grouped together for the convenience of the operator. Thus, these functions are performed by module 350 which has on its face two lamps 313 and 322 and two pushbutton operators for pushbuttons 312 and 320 generally communicating with circuitry as previously described with respect to FIG. 4 permitting module 350 to communicate on the communications medium 14.

Similarly, solenoids 316 and 310 may be implemented via a module 352 also on the communication medium 14 having screw terminals 353 connecting to actual solenoids 310 and 316 to switch power to those solenoids 310 and 316. Again, the spatial proximity of the solenoids 310 and 316 suggests they be implemented as a single switched terminal block module 352.

The proximity switch 318, although spatially proximate to the solenoids 310 and 316 requires a module that can accept inputs rather than a module that can produce outputs and hence, proximity switch 318 is implemented in a separate input module 354 having a terminal connected to a lead from the proximity switch 318.

Each of these above described elemental functions have a spatial location dictated by the physical layout of the control equipment or the need to interface with an operator. An exception to this is the FLT102 whose inputs are all from other elemental functions within the highly distributed control system and thus may be placed arbitrarily within modules 354, 350 and 352. In this case, it is positioned within module 354 according to the physical diagram 252, as will be discussed further below.

Programming

A. The Logical Diagram

Figure 13:
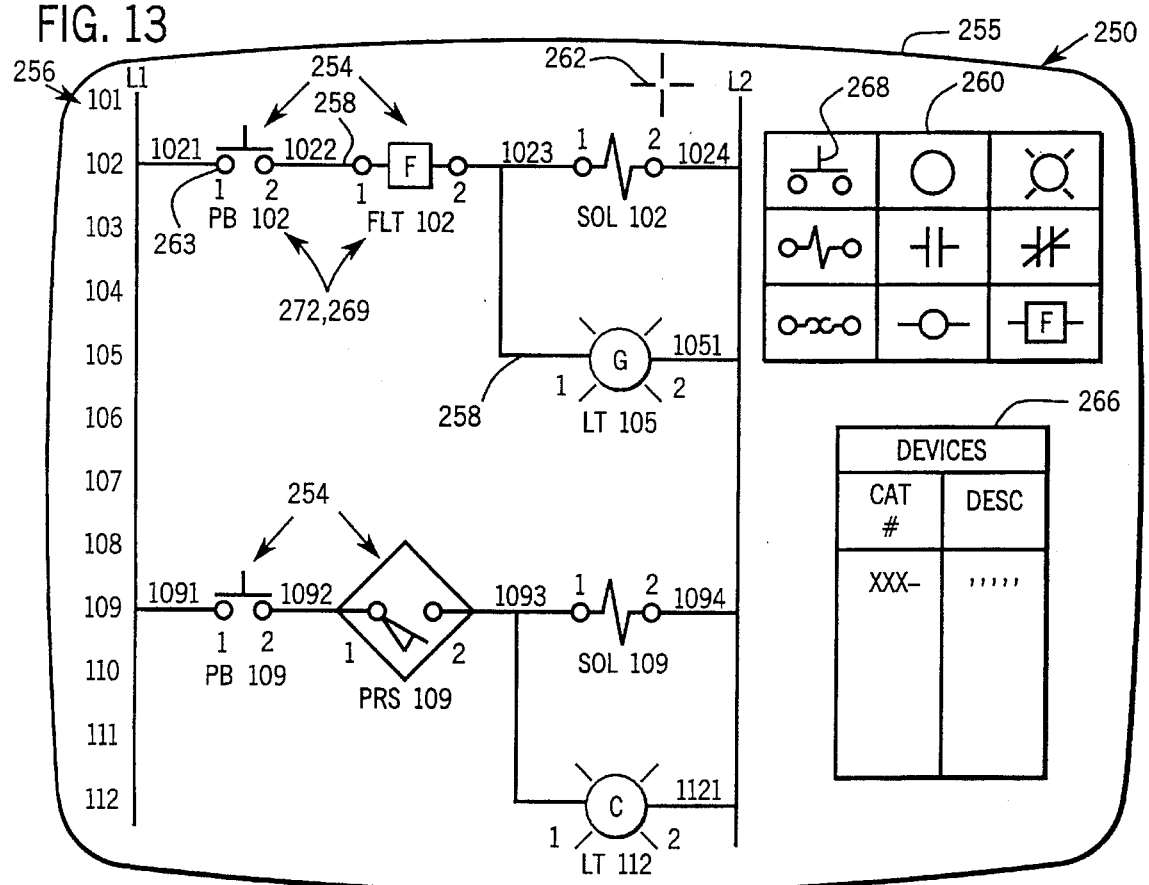
FIG. 13 is a completed schematic of an alternative industrial control system formed of elemental functions such as switches and solenoids connected together with wires, such schematic as may be developed on a CAD system and which represents a logical description of the industrial controller.
Figure 14:
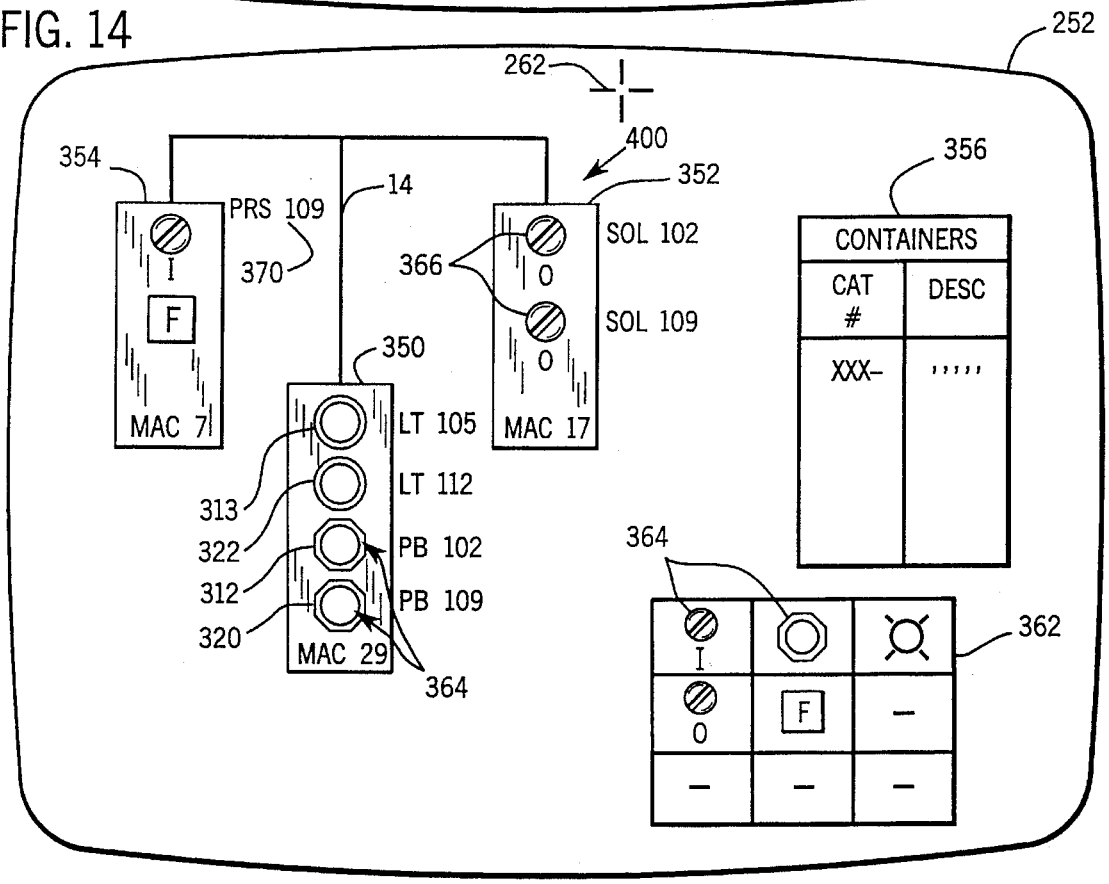
FIG. 14 is a physical view or "panel layout" of the industrial controller of FIG. 13 showing representations of the actual control modules used to implement the industrial controller and incorporating physical symbols of the various elemental functions shown in FIG. 13.

Referring now to FIGS. 13 and 14, the distinction between the logical structure of the industrial controller 300 and its physical structure is captured through the use of two separate diagrams, a logical diagram 250 and a physical diagram 252. Generally, the former describes the logical connections between elements of the controller and the latter describes the physical or spatial connections between the components which are highly distributed. These two diagrams serve as the "programming" language for the highly distributed control system 300.

The logical diagram 250 follows generally the form of the diagram of FIG. 3 but does not include the dotted outlines which designate the collection of the elemental functions performed by the discrete logical icons 254.

Logical diagram 250 may be produced on a commercial CAD package such as AutoCAD, a well known commercial CAD package produced by AutoDesk, Inc. of Sausalito, Calif. Such CAD packages which operate on standard PC-type computers are intended for the production of engineering drawings for the design of various products and produce data files representing the graphical structure of the drawings produced on the computer's electronic display. Some of these data files will be described below.

According to standard electrical schematic practice, line numbers 256 are displayed on the left side of the computer display screen 255, in this case forming the vertical margin of numbers from 101 to 112. The schematic itself is constructed interactively by the programmer between left and right vertically running lines which represent electrical power rails. These power rails are designated L1 and L2 and provide a symbolic source and sink of current carried on "wires" 258, shown as lines on the display screen 255, and by the elemental functions of the controller, shown as logical icons 254.

The control system 300 described above is represented in schematic form by the logical diagram 250 in which a logical icon 254 labeled PB102 (representing pushbutton 312 of FIG. 12) has a first terminal "1" connected to the first power rail L1 passing vertically along the left of the schematic according to conventional schematic practice. The second terminal "2" of PB102 is in turn connected to a first terminal "1" of logical icon FLT102 immediately to its right which serves in this case to prevent extremely short activations of PB102 from triggering the remainder of the circuit.

The second terminal "2" of logical icon FLT102 connects both to logical icon SOL102 (representing solenoid 310 in FIG. 12) and LT105 (representing lamp 313 in FIG. 12) both wired in parallel and having their second terminals connected to the second power rail L2 extending vertically down the left of the schematic 250.

Logical icon PB320 (representing pushbutton 320 in FIG. 12) also connects at one terminal to the power rail L1. Its second terminal connects to a first terminal of PRS109 (corresponding to proximity switch 318 in FIG. 12). The output of PRS109, the latter which is normally open, is connected to one terminal each of SOL102 (representing solenoid 316 in FIG. 12) and LT112 (representing light 322 in FIG. 12).

The programmer constructs the logical diagram 250 by selecting logical icons 254 from a menu and "wiring" with a wiring tool such as that which has been discussed above.

Figure 5A:
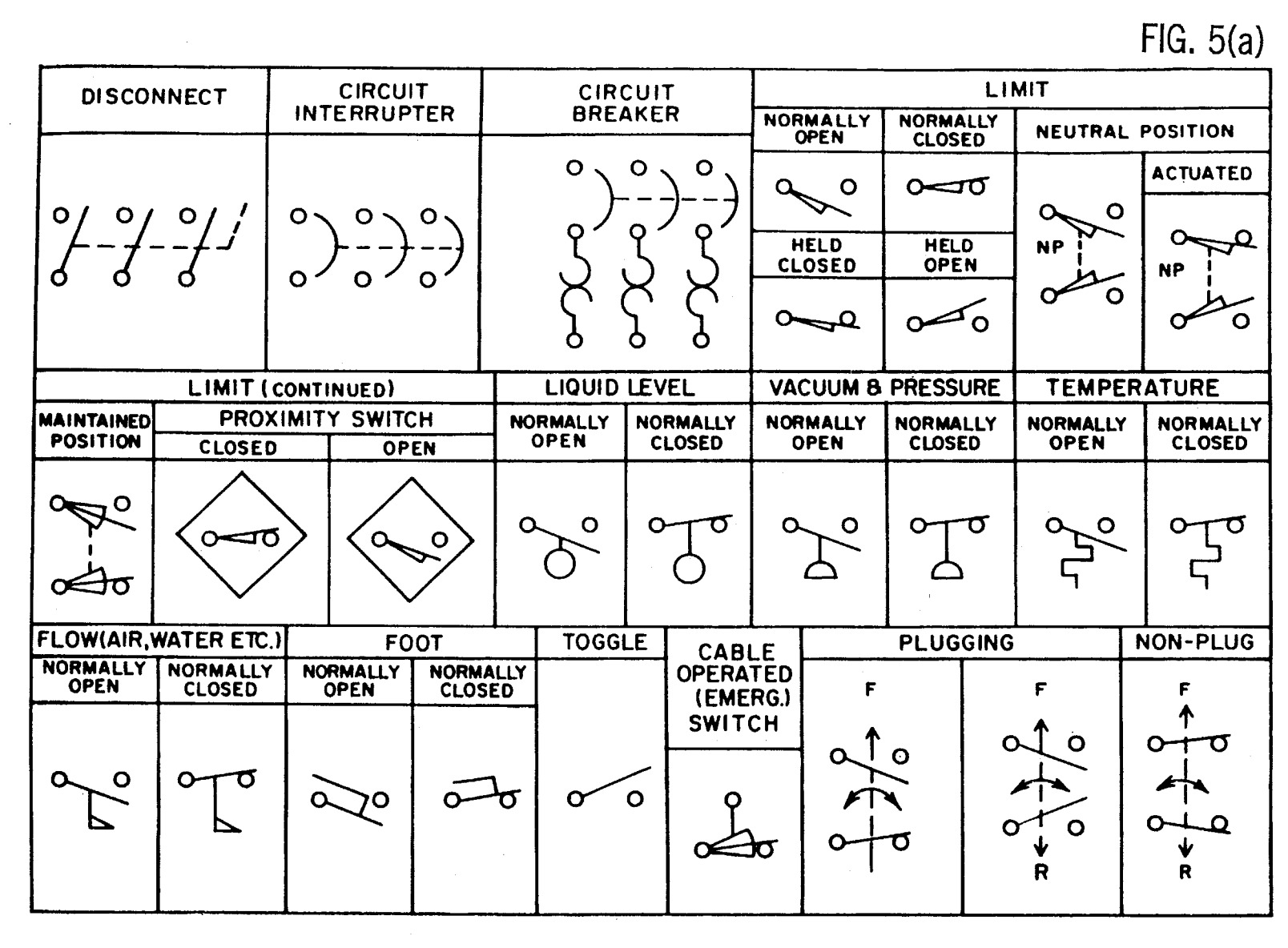
Figure 5B:
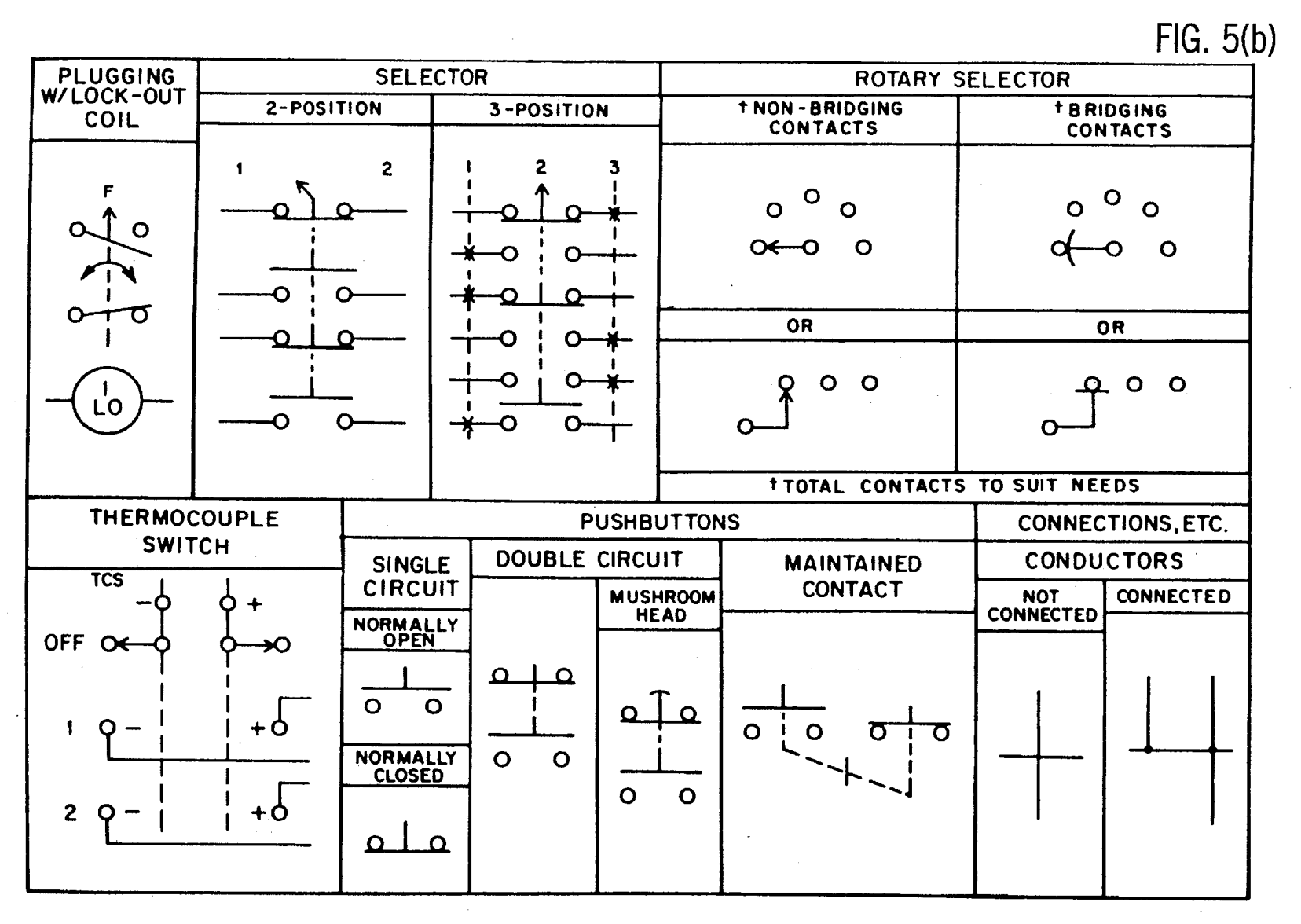
Figure 5D:
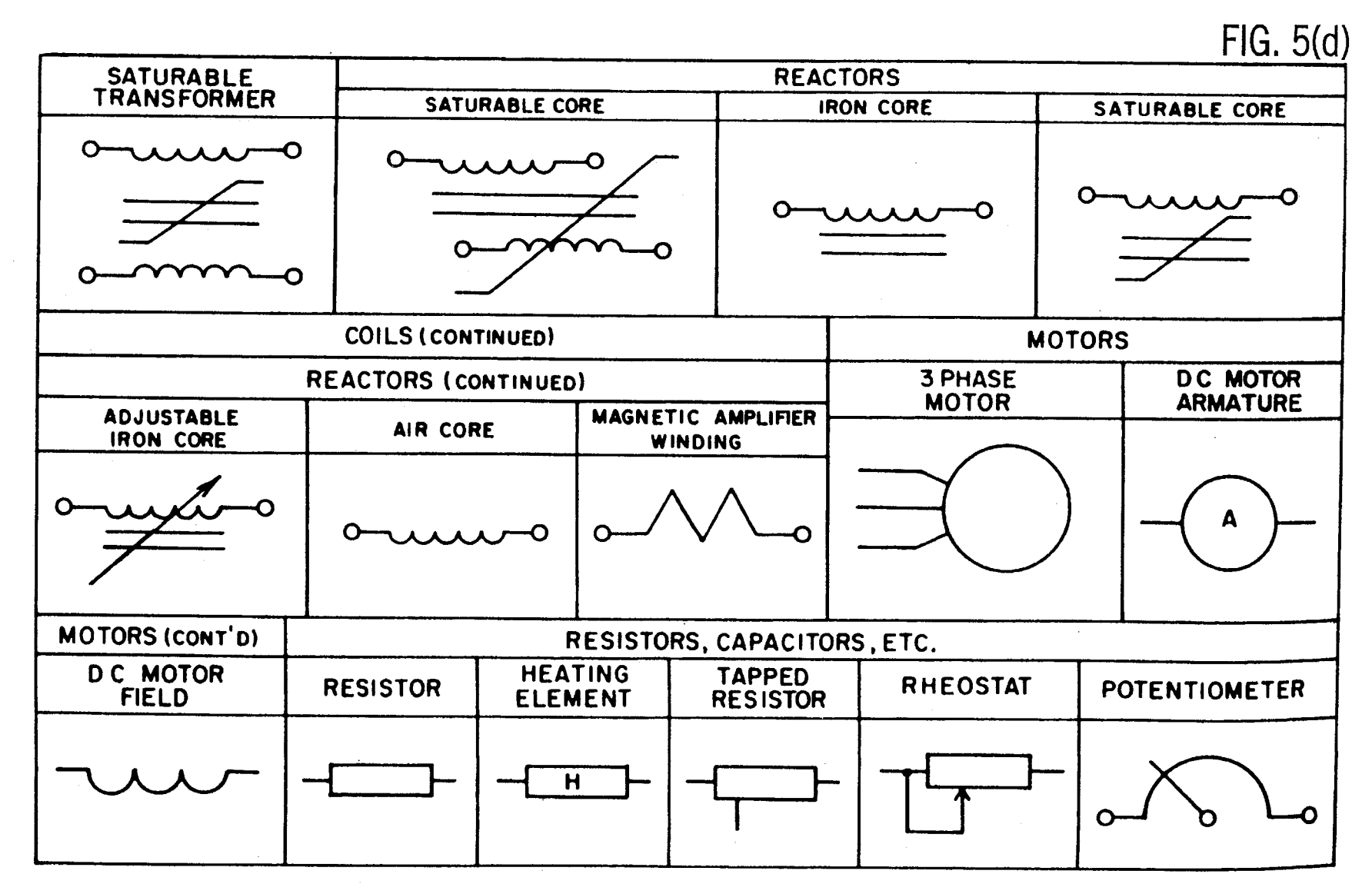

The logical icons 254 may be selected from a logical icon menu 260 to the right of the display screen 255 includes pictures of standard electrical schematic symbols such as those of FIGS. 5(*a*)–(*d*). The particular logical icons 254 may be selected by the operator by movement of a cursor 262 on the display screen 255 by means of a cursor control device such as a mouse or trackball. The cursor 262 is positioned over the appropriate symbol of the icon menu 260 which is then "dragged" to an appropriate position on the screen. A wiring tool (shown in FIG. 10) may then be invoked to connect the various discrete logical icons 254 together at their terminals 264 represented by small circles.

Each logical icon 254 is provided with an alphanumeric caption 272 displayed beneath the logical icon 254 providing a unique identifier 269 for the elemental function represented by that logical icon 254. For example the unique identifier 269 for the logical icon PB102 referred to above is simply "PB102". The unique identifier 269 is used by the CAD program to associate various qualities of the elemental function to the logical icon 254, and is generated automatically by the CAD system.

The unique identifier 269 follows standard schematic practice, the first alphanumeric portion of the caption is an abbreviation of the device type. Hence, pushbuttons employ the letters PB, proximity switches employ the letters PRS, solenoids the letters SOL, lights the letters LT and filters FLT. The numeric portion of the caption following the alphanumeric portion is the line number of the device on the schematic taken from the line numbers 256. Terminals 263 of the discrete logical icon 254 are also numbered and a page number for the particular page of the logical diagram 250 may be added for schematics that extend over multiple pages. This unique identifier 269 is then linked to a catalog type by an internal file (not shown) to provide additional information for each elemental function represented by a logical icon 254.

The power rails L1 and L2 are also represented as icons (vertical straight lines), however, they are automatically positioned on the display screen without operator intervention, and do not need further identification.

Wires 258 are also labeled with numbers related to their line numbers and their order in a line from left to right. Hence the first wire 258 at line 102 attached to L1 is numbered 1021, the next wire 258 in that line is numbered 1022 and so forth.

As each logical icon 254 is selected from the icon menu 260, a device menu 266 may appear also to the right of the display screen 255 listing various sub-categories of logical icons of that general class and providing specific catalog numbers for commercial products that are within the general class of the icon selected. In this case, the commercial products represent discrete components that work with real wire rather than the virtual components that may be implemented in the highly distributed control system of the present invention. For example, if a pushbutton switch icon 268 is selected, the device menu 266 will provide catalog numbers for various types of mechanical pushbutton switches having physical screw terminals. These pushbuttons may be normally open, normally closed and may have one or more sets of gang contacts depending on the choice of the designer.

Thus, each discrete logical icon 254 has associated with it, a catalog number for a specific device. For many catalog numbers, the same logical icon 254 will be displayed upon the display screen 255.

Additional information about each discrete logical icon 154 may be obtained from the unique identifier 269 for that logical icon 254. This additional information is provided by a second data list 267 (not visible to the programmer) linking catalog numbers and unique identifiers of the logical icons 254 to other data about the represented elemental function. Specifically, and referring to FIG. 16, the second data list 267 provides columns 269 and 275 linking by row each catalog number to each unique identifier.

A pair of columns 271 provide information about the icon used to represent the elemental function including the number of input and output terminals that may accept wires.

A column 270 provides a pointer identifying a program subroutine that may be used to emulate the elemental function represented by the unique identifier 269. For example, the operation of a pushbutton switch in normally open or normally closed states will have one of two implementing programs that may be loaded into a module to emulate the pushbutton.

Data list 267 also indicates a class 273 of the elemental function broadly characterizing those elemental functions that require special hardware like pushbutton operators or lamps. All pushbutton switches requiring a physical pushbutton operator will be of a single class, in this case class A. The filter FLT102 which requires extensive arithmetic capabilities is indicated to be a class B and thus not suitable for modules which do not have extensive arithmetic capabilities. The proximity switch PRS109, which will be implemented with a discrete proximity switch connected to screw terminals of a general purpose input module, is of class C indicating that separate hardware is required.

Closely analogous to the class 273 is a demand characteristic 274 which indicates an estimate of the burden the elemental function will place on the implementing processor of the emulating module. In this case, pushbutton switches which have relatively simple logic, have a low demands of ten whereas the filter which requires additional processor time shows a demand of 110. Demand, in other words, indicates how demanding the emulation is of hardware.

A final column of data 276 indicates whether external connection are required for the elemental function. Generally, such external connections may be either inputs or outputs from or to the controlled process or an operator. The relevance of this data 276 is that those elemental functions having external connections cannot be readily moved to a different spatial location to optimize the industrial control system. In this case, only the FLT102 has no external connections.

Figure 15:
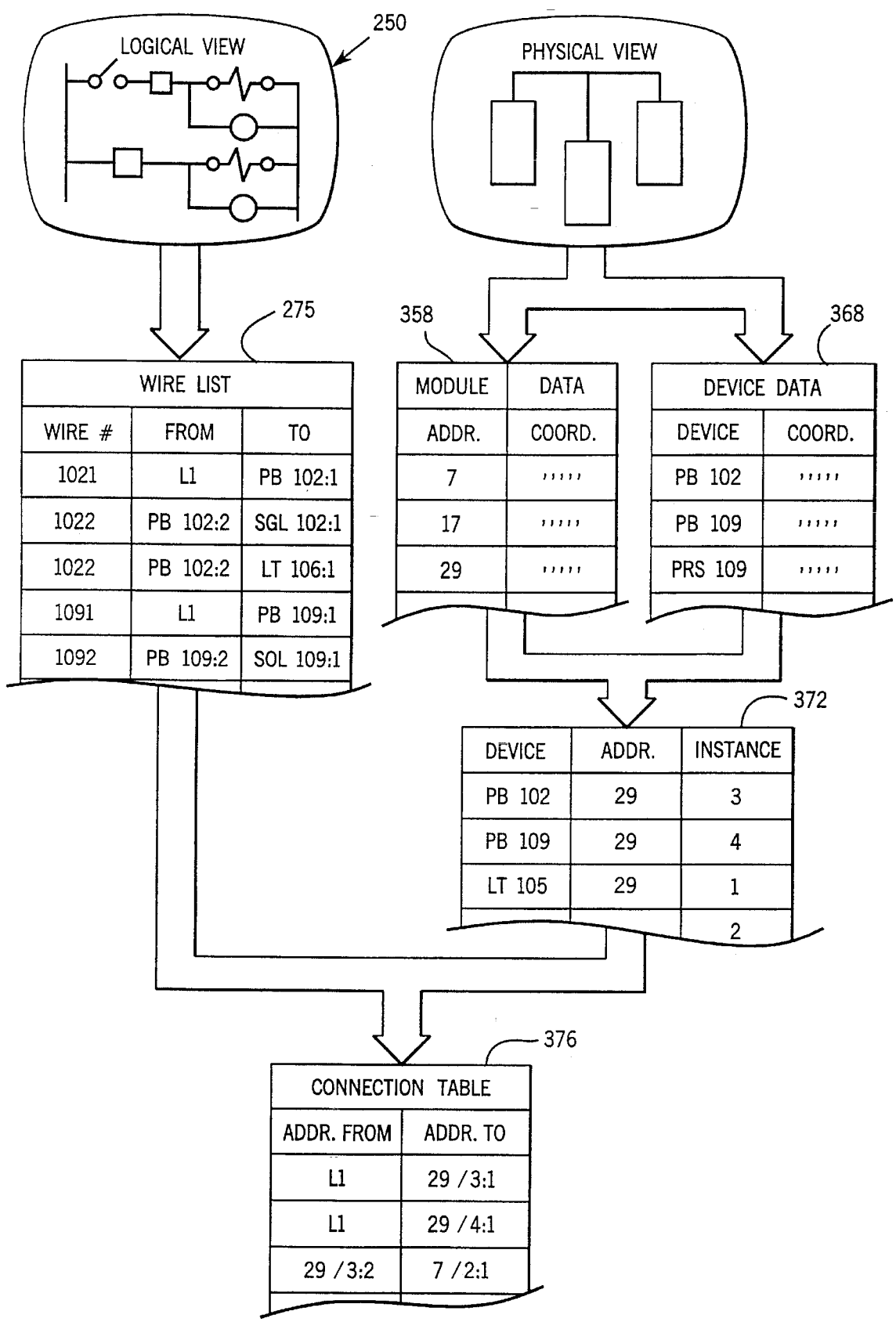
FIG. 15 is a flow chart of the compilation process of the present invention in which the logical and physical views of FIGS. 12 and 13, as displayed on an electronic display terminal and represented by graphic coordinates, are compiled to lists which may be combined to produce a connection table used for the communication of the physical modules of FIG. 14 with one another.

Referring now to FIGS. 13 and 15, the CAD program saves the data of the logical diagram 250 not as a bit map of the image of the schematic of the logical diagram 250 as it appears on the display screen 255, but rather in the form of a wire list 275 relating wire numbers to source and destination logical icons described by their unique identifier 269 and terminal numbers.

The wire list 275 thus provides three columns of data including the unique wire number and two unique identifiers for logical icons 254. The unique identifiers are augmented in this case by a terminal number separated from the unique identifier 269 by a colon. Hence PB102:1 is the first terminal of the elemental function associated with logical icon PB102. Each row of the wire list 275 identifies pairwise connections between discrete logical icons 254 and the wire making the connection. Multiple rows serve to record circuit branches.

Thus, for example, the PB102 of FIG. 12, being connected directly to the left power rail L1 by wire 1021, provides a first row in the wire list 275 as wire number: 1021, from L1, to PB 102:1. Likewise, where PB102 is next connected to FLT103, the next entry in the wire list will be wire number: 1022 from PB102:2, to SOL 102:1 indicating that current may then pass from the second terminal of PB102 to the first terminal of the FLT102.

The wire list 275 thereby provides a distillation of logical schematic 250 indicating wires and the terminals and discrete logical icons 254 to which they connect. The essential information of the wire list is produced as a file from commercially available software tools such as the PROMIS-E® automatic documentation system manufactured by ECT, Inc. of Brookfield, Wis. which runs as an application inside the AutoCAD program manufactured by AutoDesk, Inc.

The wire list 275 together with the supplemental data list 267 fully defines the logical structure of the industrial controller through the interconnections of particular discrete logical icons 254 with wires 258 and by the operation of the elemental functions represented by the logical icons 254 each which reflects the operation of a simple electrical component.

B. The Physical Diagram

In the highly distributed industrial controller 300, the elemental functions represented by the logical icons 254 are completely independent of physical implementation and must be allocated to spatially separate modules which implement those functions. The modules which provide the electronic hardware to emulate the elemental functions may be of general purpose. For example, a pushbutton module which has a pushbutton operator may emulate a normally open or normally closed switch in the present invention and may emulate switches with multiple contacts all without any change in hardware. Accordingly, the programmer has considerable flexibility in allocating the elemental functions of the discrete logical icons 254 among one or more modules.

Referring now to FIG. 13, rather than requiring the operator to perform a separate allocation of elemental functions to modules, the allocation is obtained from a second CAD document indicating the physical layout of the controller 300 and termed the physical diagram 252. A physical diagram is normally produced to permit physical wiring of the controller 300 and thus does not present a new design task.

The physical diagram 252 is created on the same CAD system used to create the logical diagram 250, by the operator, employing the following steps. First, a menu 356 is invoked providing catalog numbers and descriptions of commercially available modules for the elemental functions such as modules 352, 350, and 354. Modules differ depending on their interface to the controlled process (e.g., terminals, lights or pushbuttons) or according to specialized operation (e.g., transformers and motor controllers). Modules also differ according to the capability of their internal microprocessor and the amount of memory in the module. In one embodiment, the menu 356 provides only those modules that could be used to implement the elemental functions previously provided on the logical diagram. Typically there will be more than one module that may implement a given elemental function, and the programmer will have considerable flexibility in combining elemental functions to be implemented on a single module.

Upon selection of a module, a rectangular outline 400 appears on the screen and it is assigned a unique address on the link 14, normally in order of selection. In the example shown, module icon 354 has address 7, module icon 350 has address 29, and module icon 352 has address 17.

Referring now to FIG. 15, the link between these modules and their addresses is provided by a module data file 358 internal to the computer linking addresses with screen coordinates of the icons representing the particular modules.

Referring to FIG. 17, a second data list 360 links the module by its address 282 to other data describing the module and obtained from the menu 356. One column 284 of the second data list 360 provides a catalog number being that of the catalog information contained in the menu 356. This additional information on the modules will be used to ensure compatibility between the modules and the elemental functions to be executed on the modules as will be described below.

A second menu 362, similar to that of icon menu 260 described with respect to the logical diagram 250, provides a collection of physical icons 364 representing the outward appearance of the elemental functions used in the logical diagram 250. Generally, the physical icons 364 differ from the logical icons 254 in that they are representative of appearance of the physical device rather than its logical operation. In the case where the logical diagram 250 is prepared first, only those physical icons 364 associated with discrete logical icons 254 shown in the logical diagram 250 are presented in the menu 362.

Through use of the cursor 262, physical icons 364 are selected from the menu 362 and placed within the outlines of the modules 354, 350 and 352. For example, two "terminal" icons 366 representing outputs are placed in the outline representing the module 352. Likewise physical icons 364 for the lamps 313 and 322 and pushbuttons 312 and 320 are placed in the outline representing module 350.

Referring again to FIG. 15, this placement of physical icons 364 within the module icons is captured in a device data file 368 constructed by the CAD system and equating the unique identifiers (e.g. PB102) developed in the logical diagram 250 with the spatial coordinates of the physical symbols on the display. The unique identifiers are again provided as captions 370 in the physical diagram 252.

The physical diagram 252 is stored by the CAD system as a module data file 358 and a device data file 368. The module data file 358 links addresses on the communications medium 14 associated with a given module to the spatial screen coordinates of the outline representing that module. Similarly, the device data file 368 links the unique identifier 269 of the elemental functions to the screen coordinates of their physical symbols. This data together with an identification of the physical icon 364 used to represent the elemental function of the unique identifier 269 (provided by data list 267) is sufficient to reconstruct the physical diagram and thus incorporates its essential information.

Compilation

Figure 18:
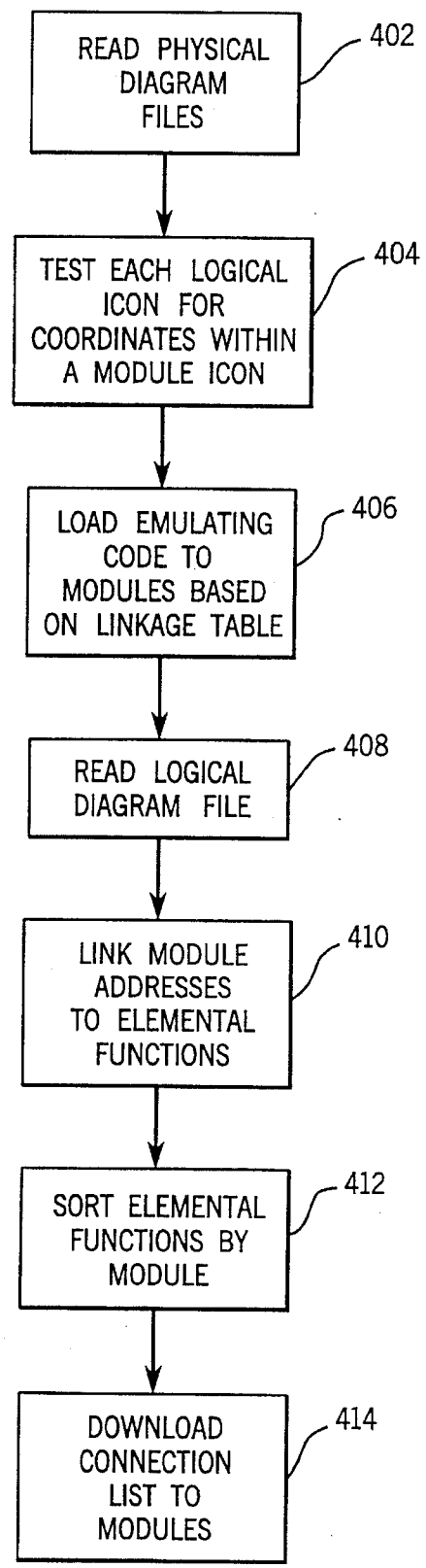
FIG. 18 is a flow chart of the steps of the compilation of FIG. 15.

Referring still to FIG. 15 and also to FIG. 18, the present invention takes those files generated by the CAD system, and representing the information in the logical and physical diagrams 250 and 252, to produce instructions that are sent over the communications medium 14 to program the various modules both to perform the elemental functions and to be virtually connected to one another according to the scheme of the logical diagram 250.

The question of what modules will receive what elemental function is solved by reviewing the module data file 358 and device data file 368 produced from the physical diagram 252 to identify which elemental functions are at which modules as determined by the overlapping of their coordinates on the screen.

This compilation, indicated by process blocks 402 and 404 of FIG. 18, produces a linkage table 372 in which each row provides (1) a unique identifier 269 for a particular elemental function, (2) an address for that device, and (3) an instance, the instance being a subaddress within the address of the module 350 to 354 used to identify that particular elemental function. Thus, for example, according to the physical diagram 252, pushbutton PB102 is in module 350 having address 29 and is instance 3, the third elemental function in that module. Messages addressed to address 29, instance 3 will be received by the software emulating pushbutton PB102.

Table 372 is next used to program the various modules by sorting through the modules by address, identifying those elemental functions that will be emulated by that module and looking up the emulating code in data list 267 for downloading to that module. This downloading is indicated by process blocks 406 of FIG. 18. In general, the emulating code is quite simple. For a pushbutton, the program simply reads messages indicating it has "received" current from another function and transmits messages indicating "current" at its output, if the pushbutton is closed, and otherwise indicates no current is present at its output.

Next, the virtual wiring between the elemental functions must be established per the logical diagram 350 per process blocks 408 of FIG. 18. This virtual wiring requires that each elemental function identify the address of outputs of other elemental functions to which it is connected and is produced by means of connection table 376 which provides a FROM and TO address indicating a virtual connection between every output terminal of an elemental function and every input terminal of an elemental function to which it is connected.

The connection table 376 is generated from the wire list 275 and the table 372 as indicated by process blocks 410 of FIG. 18. Specifically, each elemental function identified on the wire list 275 is linked to its address and instance from table 372 to create a composite address including the address of the module 354 followed by the instance of the elemental function within the module followed by a terminal number of the elemental function. The number of terminals of the device is provided in data list 267 and is part of the information predetermined by the catalog number of the device.

Thus, for example, the input terminal of pushbutton PB102 has the address 29/3:1 where 29 is the address of its module, 3 is the instance number in the module and 1 is the number of its terminal which is the input as shown on the logical diagram 250. Then, for example, wire 1021 connecting the device L1 to the first terminal of pushbutton PB102 shows a row in the connection table where the address FROM is L1 (a standard designation since L1 will always be in every logical chart 250) and a second column of that row for the address TO being 29/3:1.

Implementing the virtual connection between modules may be performed by finding each module with an address TO entry and loading that row of the connection table to that module to create a connection chart (as has been described above) for that module allowing it to recognize the address of messages intended for its elemental functions and to correctly forward those messages to the necessary code fragments run on the module 350. This sorting is indicated by process blocks 412 and 414 of FIG. 18.

It will be understood that the creation of the physical diagram 252 and the logical diagram 250 may be done on conventional CAD equipment which produces data such as in the wire list 275, module data file 358, and device data file 368 as a function of its normal operation. The operator, after generating these diagrams may be otherwise unconcerned with the programming and interconnection of the modules.

This simple programing approach, in practice, also requires an ability to check to see if the particular elemental functions are compatible with the modules chosen to emulate them. This is done by reference to the data lists 267 and 360 described above with reference to FIGS. 16 and 17. Columns also indicate a class 283 and a capacity rating 285 which indicates generally the capabilities of the microprocessor associated with the physical module 350 through 354 and specific hardware elements such as pushbutton operators or screw terminals. Generally, for an elemental function as described in data list 267 to operate in a given module 350 to 354, the class 273 of the elemental function must be the same as the class 283 of the module provided in second data list 360 and the total demand 274 on processor resources of each of the elemental functions together as provided by data list 267 must be less than the capacity 285 of the module as indicated in second data list 360.

Referring also to FIG. 12, in the present invention, for example, module 350 having address 29 is of class B and has a capacity of 100. Here, both the elemental functions of the lights LT105 and LT112 (313 and 322) and pushbuttons PB102 and PB109 (312 and 320) are class A and thus can be performed by the module 350 and a total of two lights and two pushbuttons create a demand of 40 (10 per elemental function) less than the capacity of the module 350, so this constraint is satisfied also.

On the other hand, the filter FLT102, requiring additional processing power has a demand of 110. This together with the demand 20 of the proximity switch 109 exceeds the capacity 150 of the module 354 and thus an error will be signaled to the operator. The filter FLT102 has no class and is compatible with any class of module because it has no particular external hardware requirements.

The process of detecting such incompatibilities between elemental functions and the assigned modules involves cross-referencing each elemental function to its module by detecting whether the physical symbol of the elemental function is within the outlines of the rectangle representing the particular module, as described above. Demands 274 of the elemental functions are then compared against capacities 285 of the associated modules. Classes of elemental functions and modules are compared.

Conflicts may be signaled to the operator on the screen with the messages indicating either that the particular module selected cannot perform the function or that too many functions are being performed by the particular module and this may be done during the creation of the physical diagram 252. In this way, the operator may reallocate elemental functions among physical modules independent of the logical connections of those modules in the logical diagram 250.

Alternatively, automatic reallocation of elemental functions among modules may be performed. First, each of the elemental functions must be identified by whether it has external connections or not. Referring to FIG. 16, supplemental data list 267 indicates that pushbutton lights and a proximity switch each have external connections but that the filter FLT102 does not. Generally, it is not practical to move elemental functions that have external connections because of the additional network traffic needed to transmit inputs and outputs for that elemental function to a remote module. Accordingly, the program reallocates the filter FLT102 from the physical location selected by the operator according to the physical diagram 252.

This reallocation is preferably not visible to the operator but done solely by the computer which scans through the available modules listed in second data list 360 to identify those modules with the suitable class and then checks to see whether addition of the filter would overload the capacity of the selected modules. The first module meeting the criteria is selected and the filter FLT102 moved to that module. The movement means simply that the address of the elemental functions representing the filter FLT102 changes according to the address of the new module and the new module receives the program fragment necessary to implement the filter FLT102 when the highly distributed system is downloaded from the programming terminal.

If it is desired to show this change to the operator, the device data file 368 may be changed so that the coordinate of the filter FLT102 is modified to a coordinate within the new module icon selected for the filter function.

Thus, a conventional CAD system may be largely used as the programming language for the highly distributed system providing at the same time the benefits of producing accurate documentation showing both the logic of the industrial control system and the physical layout of its modules, the latter which may be used for actually wiring the modules together.

Many other modifications and variations of the preferred embodiment which will still be within the spirit and scope of the invention will be apparent to those with ordinary skill in the art. In order to apprise the public of the various embodiments that may fall within the scope of the invention, the following claims are made:

We claim:

1. A method of programming a highly distributed industrial controller comprised of a plurality of physically distinct modules communicating along a shared communications link, the modules transmitting and receiving messages on the communications link, the method of programming comprising the steps of:

(a) generating a logical diagram depicting the industrial controller in the form of an electrical schematic of electrical symbols on an electronic display screen,
   the electrical symbols representing elemental electrical functions and having at least one input terminal and at least one output terminal,
   the terminals representing points between which current flows according to the elemental function, each terminal having a state indicating current flow,
   the terminals connected by lines representing wires to terminals of other electrical symbols and
   wherein
   one such electrical symbol is connected to a power source symbol;

(b) generating a physical diagram, on the electronic display screen, showing outlines representing the modules surrounding physical symbols representing the elemental functions to be performed by the modules;

(c) programming the modules to emulate the elemental function of the physical symbols associated with the module by the physical diagram; and (d) compiling the physical and logical diagrams to generate a communications table establishing communications between the modules on the communications link so that the elemental functions executed by a given module may communicate the state of their terminals with other elemental functions in other modules as if the electrical symbols of those elemental functions were wired together according to the logical diagram.

2. The method of claim 1 wherein each module has a unique address on the shared communications link and wherein the compilation of step (d) produces an address list indicating for each given elemental function performed by a given module, the address of other modules having other elemental functions whose electrical symbols are connected to the electrical symbol of the given elemental function by the logical diagram.

3. The method of claim 1 wherein the physical symbols depict the appearance of a physical equivalent to the elemental function.

4. The method of claim 1 wherein the physical diagram indicates the interconnection of the modules by the shared link by means of a line connecting the outlines.

5. The method of claim 1 wherein step (d) comprises:

(i) reviewing the physical diagram to assign each terminal of the electrical symbols with an address formed of an address of the module to which its elemental function is allocated and a unique sub-address within that module;

(ii) reviewing the logical diagram to determine the interconnections between each electrical symbol; and (iii) relating the interconnection to the assigned addresses to produce the communications table.

6. The method of claim 1 wherein each module has a capability index indicating those elemental functions that can be performed by that module and wherein the compiling of step (d) reviews the physical diagram and the capability index of the modules to verify that the elemental functions assigned to each module can be performed by the module and if not provides an indication to an operator.

7. The method of claim 1 wherein each module has a capability index indicating those elemental functions that can be efficiently performed by that module and wherein the compiling of step (d) also reviews the physical diagram and alters the assignment of elemental functions to the physical modules if the allocation of elemental functions indicated by the physical diagram allocates elemental functions to modules that cannot efficiently perform those elemental functions.

8. The method of claim 7 including the step of:

(e) identifying each elemental function as either module dependent and thus not freely movable to another module or module independent, and reallocating the module independent elemental functions to modules other than those indicated by the physical diagram to ensure the module independent functions are allocated to modules that can efficiently perform the elemental functions.

9. The method of claim 7 wherein the capability index is a function of the module hardware and of the number of elemental functions assigned to the module.

10. The method of claim 1 including the step of:

(e) identifying each elemental function as either module dependent and thus not freely movable to another module or module independent, and reallocating the module independent elemental functions to modules other than those indicated by the physical diagram to reduce the need for communications between modules on the shared communications link.

11. The method of claim 1 including the additional step of:

(e) loading at least a portion of the communication table into each module so that it may initiate messages to other modules to communicate the state of the terminals of the electrical symbols of its elemental functions to the elemental functions of the other modules.

12. The method of claim 1 wherein the physical diagram of step (b) is generated by selecting among a menu of module types having predefined construction electrical symbols.

13. A method of programming a highly distributed industrial controller comprised of a plurality of physically distinct modules communicating along a shared communications link, the modules transmitting and receiving messages on the communications link, the method of programming comprising the steps of:
- (a) writing a logical program indicating a logical operation of the industrial controller, the logical operation comprised of a purality of elemental functions;
- (b) writing a physical program indicating an allocation of the elemental functions to modules;
- (c) programming the modules to emulate the elemental functions indicated by the physical program;
- (d) compiling the physical and logical programs to generate a communications table establishing the communications between the modules on the communications link so that the elemental functions executed by a given module may communicate with other elemental functions in other modules to execute the logical program; wherein each module has a capability index indicating those elemental functions that can be efficiently performed by that module and wherein the compiling of step (d) reviews the physical program and the capability index of the modules to verify that the elemental functions assigned to each module can be efficiently performed by the module and if not provides an indication to an operator.

14. The method of claim 13 wherein the compiling of step (d) also reviews the physical program and alters the assignment of elemental functions to the physical modules if the allocation of elemental functions indicated by the physical diagram allocates elemental functions to modules that cannot efficiently perform those elemental functions.

15. The method of claim 13 including the step of:
- (e) identifying each elemental function as either module dependant and thus not freely movable to another module or module independent, and reallocating the module independent elemental functions to modules other than those indicated by the physical program to reduce the need for communications between modules on the shared communications link.

* * * * *